US012469284B2

(12) United States Patent
Ma

(10) Patent No.: US 12,469,284 B2
(45) Date of Patent: Nov. 11, 2025

(54) METHODS, SYSTEMS, AND NON-TRANSITORY COMPUTER-READABLE STORAGE MEDIUM FOR MAKING REFEREE DECISIONS WITH MACHINE LEARNING IN THE SPORT OF SQUASH

(71) Applicant: Enqi Ma, Medina, WA (US)

(72) Inventor: Enqi Ma, Medina, WA (US)

(*) Notice: Subject to any disclaimer, the term of this patent is extended or adjusted under 35 U.S.C. 154(b) by 0 days.

(21) Appl. No.: 18/824,843

(22) Filed: Sep. 4, 2024

(65) Prior Publication Data

US 2025/0078507 A1   Mar. 6, 2025

Related U.S. Application Data

(60) Provisional application No. 63/536,490, filed on Sep. 4, 2023.

(51) Int. Cl.
*G06V 20/40* (2022.01)
*G06T 7/20* (2017.01)
(Continued)

(52) U.S. Cl.
CPC ........... *G06V 20/42* (2022.01); *G06T 7/20* (2013.01); *G06T 7/70* (2017.01); *G06T 11/203* (2013.01);
(Continued)

(58) Field of Classification Search
None
See application file for complete search history.

(56) References Cited

U.S. PATENT DOCUMENTS

2011/0213450 A1* 9/2011 Maclean ............ A61F 2/95
                                                  623/1.11
2015/0045688 A1* 2/2015 Nardi ............... A61B 5/372
                                                  600/544
(Continued)

FOREIGN PATENT DOCUMENTS

CA       3061908 C    * 4/2021  ............ G06V 20/42
WO   WO-2025039055 A1 * 2/2025  ............ A63B 71/06
WO   WO-2025049407 A1 * 3/2025  ........... G06N 3/0475

OTHER PUBLICATIONS

Brumann, et al. ("Evaluation of Open-Source and Pre-Trained Deep Convolutional Neural Networks Suitable for Player Detection and Motion Analysis in Squash" Sensors 2021, 21(13), 4550; https://doi.org/10.3390/s21134550 Jul. 2021) (Year: 2021).*
(Continued)

*Primary Examiner* — Tyler W. Sullivan
(74) *Attorney, Agent, or Firm* — Arch & Lake LLP

(57) ABSTRACT

A method for making referee decisions is provided. The method includes: extracting, by a video analyzer, a plurality of position values from a video frame of squash; calculating, by the video analyzer, a plurality of distance values between the plurality of position values; training, by the video analyzer, a neural network using input values comprising the plurality of position values and the plurality of distance values; obtaining, by the video analyzer and from the neural network, a plurality of output probability values corresponding to a plurality of decisions; and determining, by the video analyzer for a referee in a sport of squash, one of the plurality of decisions corresponding to one of the plurality of output probability values that is higher than others of the plurality of the output probability values.

20 Claims, 36 Drawing Sheets

(51) Int. Cl.
*G06T 7/70* (2017.01)
*G06T 11/20* (2006.01)
(52) U.S. Cl.
CPC .............. *G06T 2207/20081* (2013.01); *G06T 2207/20084* (2013.01)

(56) References Cited

U.S. PATENT DOCUMENTS

2020/0364565 A1* 11/2020 Kostem .............. G01N 21/6454
2021/0264141 A1* 8/2021 Chojnacki .............. G06V 40/25
2024/0185554 A1* 6/2024 Velardo .................. G06V 20/42

OTHER PUBLICATIONS

STIC Provided translation of WO2025/039055 (Year: 2023).*

* cited by examiner

METHODS, SYSTEMS, AND NON-TRANSITORY COMPUTER-READABLE STORAGE MEDIUM FOR MAKING REFEREE DECISIONS WITH MACHINE LEARNING IN THE SPORT OF SQUASH

CROSS-REFERENCE TO RELATED APPLICATION

The present application is based upon and claims priority to U.S. Provisional Application No. 63/536,490, entitled "Systems and Methods for Making Referee Decisions with Machine Learning in the Sport of Squash," filed on Sep. 4, 2023, the entirety of which is incorporated by reference for all purposes.

TECHNICAL FIELD

The present disclosure is related to machine learning and sports playing. More specifically, this application relates to methods, systems, and non-transitory computer readable storage medium on improving accuracy or quality of making referee decisions with machine learning in the sport of Squash.

BACKGROUND

Squash is a racket sport played by two people in a four-wall court. The players alternate turns to strike the ball, while the goal is to keep the ball in-bounds while making the opponent unable to retrieve the ball before two bounces on the floor. Every shot should hit the front wall before it bounces on the ground for the shot to be deemed as an in-bound shot, while the sidewalls could be used to change the ball trajectory before or after the ball reached the front wall. Squash is considered one of the most physically demanding sports as the rallies are frequent and lasts for a long period of time.

SUMMARY

Embodiments of the present disclosure provide methods, systems, and non-transitory computer readable storage medium on improving accuracy or quality of making referee decisions with machine learning in the sport of Squash.

According to a first aspect of the present disclosure, there is provided a method for making referee decisions, including: extracting, by a video analyzer, a plurality of position values from a video frame of squash; calculating, by the video analyzer, a plurality of distance values between the plurality of position values; training, by the video analyzer, a neural network using input values comprising the plurality of position values and the plurality of distance values; obtaining, by the video analyzer and from the neural network, a plurality of output probability values corresponding to a plurality of decisions; and determining, by the video analyzer for a referee in a sport of squash, one of the plurality of decisions corresponding to one of the plurality of output probability values that is higher than others of the plurality of the output probability values.

According to a second aspect of the present disclosure, there is provided a system for making referee decisions, including: one or more processors; and one or more memories having stored thereon one or more instructions, where the one or more instructions, when executed, causes the one or more processors to perform acts including: extracting, by a video analyzer, a plurality of position values from a video frame of squash; calculating, by the video analyzer, a plurality of distance values between the plurality of position values; training, by the video analyzer, a neural network using input values comprising the plurality of position values and the plurality of distance values; obtaining, by the video analyzer and from the neural network, a plurality of output probability values corresponding to a plurality of decisions; and determining, by the video analyzer for a referee in a sport of squash, one of the plurality of decisions corresponding to one of the plurality of output probability values that is higher than others of the plurality of the output probability values.

According to a third aspect of the present disclosure, there is provided a non-transitory computer-readable storage medium for storing computer-executable instructions that, when executed by one or more computer processors, cause the one or more computer processors to perform acts including: extracting, by a video analyzer, a plurality of position values from a video frame of squash; calculating, by the video analyzer, a plurality of distance values between the plurality of position values; training, by the video analyzer, a neural network using input values comprising the plurality of position values and the plurality of distance values; obtaining, by the video analyzer and from the neural network, a plurality of output probability values corresponding to a plurality of decisions; and determining, by the video analyzer for a referee in a sport of squash, one of the plurality of decisions corresponding to one of the plurality of output probability values that is higher than others of the plurality of the output probability values.

BRIEF DESCRIPTION OF THE DRAWINGS

The accompanying drawings, which are incorporated in and constitute a part of this specification, illustrate examples consistent with the present disclosure and, together with the description, serve to explain the principles of the disclosure.

FIG. 52A illustrates two further trials of models trained on all six data points. FIG. 52B illustrates two further trials of models trained for "Dropping out Racket Head Position"; FIG. 52C illustrates four further trials of models trained for "Dropping out Racket Head Position and the First Bounce Position"; FIG. 52D illustrates four further trials of models trained for "Dropping out Racket Head Position and the Second Bounce Position"; FIG. 52E illustrates two further trials of models trained for "all nine modified data (MD) points"; FIG. 52F illustrates two further trials of models trained for "including MD #1-4, #6, and #8-9"; FIG. 52G illustrates two further trials of models trained for "including MD #1-4 and #6"; FIG. 52H illustrates two further trials of models trained for "training with all 21 data points"; FIG. 52I illustrates two further trials of models trained for "training with PD 1-10 and all MD"; FIG. 52J illustrates two further trials of models trained for "training with PD 1-10 and MD #3, #5-6, and #8-9."

DETAILED DESCRIPTION

Figure 1:
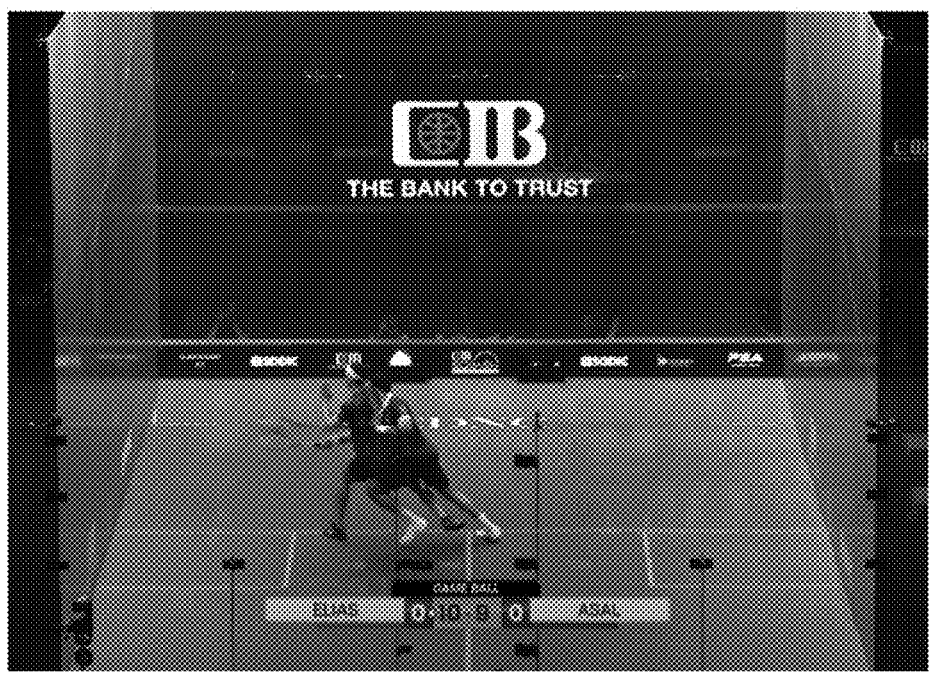
FIG. 1 illustrates an example of player interference.

Reference will now be made in detail to specific implementations, examples of which are illustrated in the accompanying drawings. In the following detailed description, numerous non-limiting specific details are set forth in order to assist in understanding the subject matter presented herein. But various alternatives may be used without departing from the scope of claims and the subject matter may be practiced without these specific details. For example, the subject matter presented herein can be implemented on many types of electronic devices with digital video capabilities.

It should be illustrated that the terms "first," "second," and the like used in the description, claims of the present disclosure, and the accompanying drawings are used to distinguish objects, and not used to describe any specific order or sequence. It should be understood that the data used in this way may be interchanged under an appropriate condition, such that the embodiments of the present disclosure described herein may be implemented inorders besides those shown in the accompanying drawings or described in the present disclosure.

In this disclosure, we trained neural networks to predict squash referee decisions using data from 400 referee decisions acquired through extensive video footage reviewing and labeling. Six positional values were extracted, including the Attacking Player's Position, Retreating Player's Position, Ball's Position in the frame, Ball's Projected First Bounce, Ball's Projected Second Bounce, and Attacking Player's Racket Head Position. We calculated nine additional distance values, such as the distance between players and the distance from the attacking player's racket head to the ball's path. Models were trained on Wolfram Mathematica and Python using these values.

The best Wolfram Mathematica model achieved an 86%±3.03% accuracy, while the best Python model performed a 0.852±0.051 accuracy (85.2%±5.1%). These accuracies surpass 85%, demonstrating near-human performances. Our model has great potential for improvement as it's currently trained with limited data and lacks crucial data points such as time and speed. Unlike human referees, machine learning models follow a consistent standard, have unlimited attention span, and make decisions instantly. If the accuracy is improved in the future, the model can potentially serve as an extra refereeing official for both professional and amateur squash matches.

Interferences and Referee Decisions

Because the two players are playing the game in one court, one inevitable aspect of squash is interference. The presence of one player, through inaccurate position or movement, might affect or prevent the shot of another player. One simple example could be this: player A strikes the ball, but the ball lands back next to player A and player A is not able to get out of the way (in squash terms, "clear the ball"). In this case, player B would have hit player A if player B attempted to hit the ball. This is one common situation of interference.

When players stopped due to interference, the player who is supposed to strike the ball would choose to appeal to the referee for a decision.

In those situations, referees need to make a decision to fairly punish or reward players for the interference that had happened. In squash, there are three possible decisions: Stroke, Yes Let, and No Let. A Stroke for the appealing player awards a point to the player; a Yes Let means the point needs to be replayed; a No Let for the appealing player awards a point to the other player.

The Professional Squash Association (PSA) defines the decisions and their situations of applications as follows:

"Yes Let decision results in the rally being played again—with the referee deeming that the interference was accidental and both players have made an equal effort to allow play to continue.

No Let decision is where the referee rules against the striker's appeal and awards a point to the retreating player. In this situation, the referee deemed that the retreating player provided unobstructed access and that interference was minimal, therefore the appealing striker could have played a shot.

Stroke is when the point is awarded to the appealing player. A stroke is awarded when the referee deems the incoming striker is in a position to play a shot, but suffers interference due to the outgoing player not making every effort to clear." (PSA World Tour, 2023)

The ultimate guidelines for clearing a shot are explained by PSA as followed: "After playing a shot, players must make every effort to 'clear the ball' so that when the ball rebounds from the front wall, the opponent has both a good view of the ball;
unobstructed access to the ball with the space to make a reasonable swing at the ball;
the freedom to strike the ball to any part of the entire front wall.

The incoming player must then make every effort to play through minimal interference and complete their shot. A striker who believes that interference has occurred may stop and request a let, at which point the referee must make a ruling, awarding either a 'Let', 'No let' or 'Stroke'." (PSA World Tour, 2023)

Therefore, in the above-mentioned situation of player A and B, player B would stop and appeal. The correct decision from the referee would be a stroke to player B, because player A had obstructed player B's access to the ball. Therefore, player B would be awarded the point, and the match would continue with the next rally.

Controversies and Disputes

Regarding the Central Referee

Although all referees should strive for logical, unbiased decisions, the pace of squash and the complexity of professional player's movements can make some decisions extremely difficult to make. An individual referee's personal understanding of the game and the referee's experience at the position could also affect the result. Although PSA had introduced the video-review system, there still exist many controversies both from between players and referees and from the viewing audiences.

The Video Review System

The video review system consists of a real-time replay system and one video referee. Whenever a player wants to challenge a referee's decision and, at the same time, has a "review remaining," the tech crew would replay the recording from the past rally from multiple angles and the video referee would make a decision based on the replay. The new decision would overrule (or uphold) the previous decision made by the central referee. The replay system allows the video referee to review the system in slow motion and various angles, and most of the time the review system can correct the calls. However, the video review can take a long time, including the time needed to retrieve the recordings and the time the video referee needs to fully understand the situation. This significantly disrupts the flow of the game. Therefore, the PSA only allows players to review once per game, and if the player successfully reviewed a decision, they will get another review. The disruption of the game is still a minor issue. After all, the decision is still made by an isolated individual, and the biases and differences in understanding of the game would also affect the video referee when making those decisions. There are numerous cases that a controversial call is upheld after being video reviewed, or an even more controversial decision is made after video reviewing.

Controversies and Arguments

Figure 2:
FIG. 2 illustrates an example of player unsatisfaction.
Figures 3, 4:
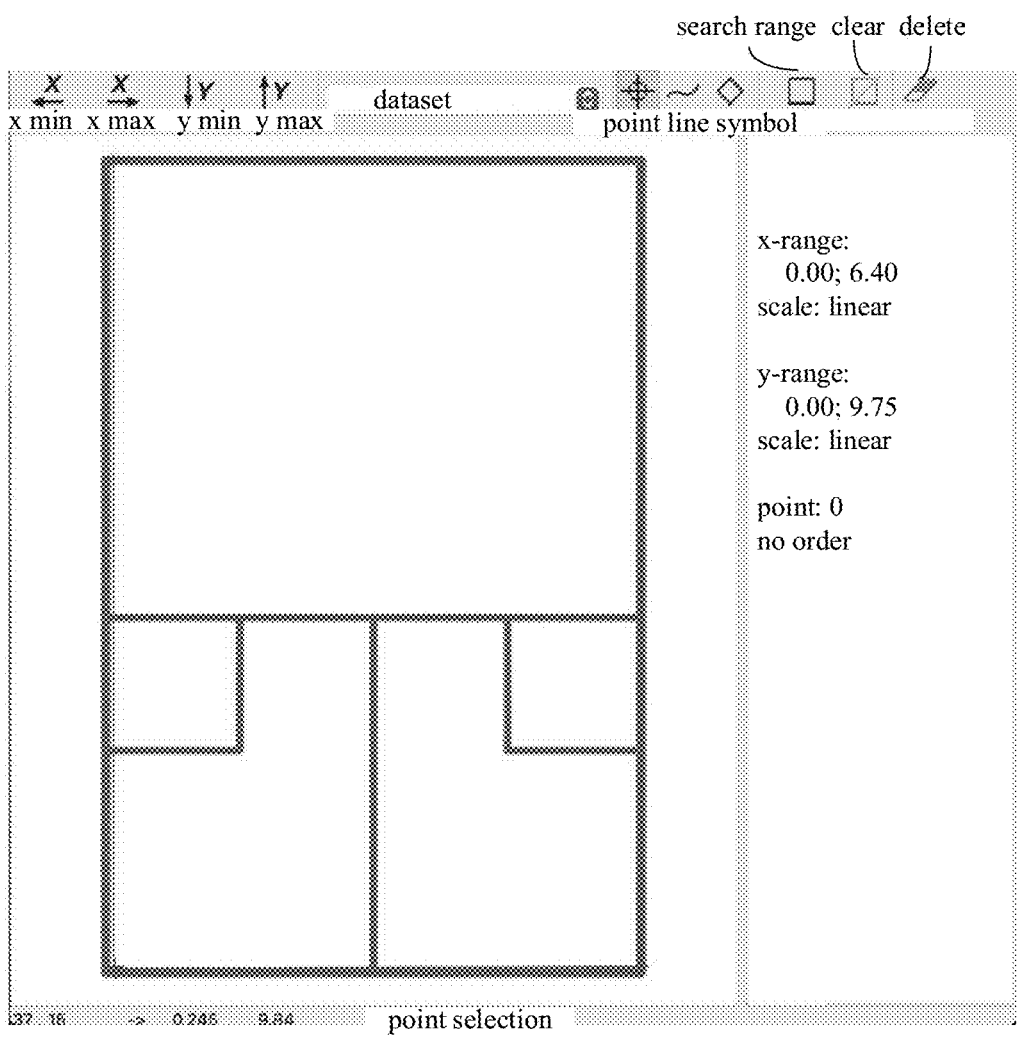
FIG. 3 illustrates audience's comments on the game.
FIG. 4 illustrates a relevant tool Digitzeit.

PSA struggles with the refereeing problems as the sports grew bigger and more popular among people, and the issue has been kept relatively small due to the video review system on the professional tour. However, junior and college squash has been very susceptible to controversial referee decisions as the referee's words are the final judgment and there is no way to reverse a referee's decision. After all, decisions that go against the players' and the viewers' common sense undermine both the competing experience and the viewing experience. The PSA has strived to solve this issue by updating referee guidelines and refining the video review system. However, those measures have not been very effective. There still regularly exists dissatisfaction from audiences and arguments between players and referees. FIG. 1 is an example of player interference. (SQUASHTV, 2023). FIG. 2 shows player unsatisfied with the decision and opened the back door to argue with the referee (which would result in conduct warning if referee don't want the discussion) (SQUASHTV, 2023). FIG. 3 shows audience's comments under PSA's YouTube channel commenting on their dissatisfaction with the refereeing work. (SQUASHTV, 2023).

Machine Learning and Literature Review

One root cause of the controversy is a lack of exact measurement in referee decisions. Usually referees make decisions based on several evaluations: is there a clear path to the ball, was the retrieving player blocked from the path to the ball, could the player have got it had there been no interference, did the player show enough effort to play through the interference, did the retreating player block the access to the entire front wall, or was it due to safety the player stopped to appeal. There exist several crucial ideas: clear path, ability to retrieve, effort, blockage, and safety. All referees have different understandings of those concepts, which would result in different decisions. One referee might deem that a player is able to retrieve had there been no interference, but another referee might think the opposite. This disagreement of measures and the fundamental subjectivity underlying those decisions caused the never-ending disputes in squash refereeing.

Machine learning, on the other hand, could eliminate those differences caused by referees' objectivity, since once the network is trained to have set parameters, the same situation would only result in the same decision.

Though it has not specifically been applied to squash refereeing, machine learning has been widely used in sports applications.

For squash specifically, models have been trained to perform player detection and motion analysis (Brumann, Mukuk, & Reinsberger, 2021). Brumann's research team investigated more than 250 Human Pose Estimation-CNNs and found the five most effective models in the context of motion analysis for squash. The data being used were collected from publicly available squash videos, and Brumann's team developed their own annotation tool and manually labeled frames and events. Using the labeled data and the trained CNNs, they were able to present heatmaps, which depict the court floor using a color scale and highlight areas according to the relative time for which a player occupied that location during play. Numerous general machine learning models used for motion detection have also been proposed. In 2013, a motion detection model was proposed utilizing machine learning and data clustering and achieved scene adaptive motion detection (Hu, Zheng & Li, 2013). In 2016, a model capable of accurately detecting black and white soccer balls was produced using a series of heuristic region-of-interest identification techniques and supervised machine learning methods (Menashe, 2018). In 2021, a model based on the YOLOv3 object detection model was introduced and addressed the detection of small, fast-moving balls in sport video data. (Hiemann, Kautz, Zottmann & Hlawitschka, 2021)

Machine learning has also been applied to the sport of tennis to predict match outcomes (Bayram, Garbarino & Barla, 2021). Bayram trained and tested models using advanced machine learning paradigms such as Multi-Output Regression and Learning Using Privileged Information on more than 83,000 men's singles tennis matches between the years 1991 and 2020. The results, concluded by Bayram, outperform the existing methods in the literature and the current state-of-the-art models in tennis. In 2018, a A tree-based boosting model was proposed to Predict biathlon shooting performance (Maier, Meister, Trösch & Wehrlin, 2018). In 2019, a model using the RandomForest algorithm obtained a precision of 0.857 and a recall of 0.750 in soccer match prediction (Capobianco, Giacomo, Mercaldo, Nardone & Santone, 2019). The model was trained with data acquirable both after the match and during the match play. In 2021, a deep-learning model featuring Regression and Classification Analysis was trained to predict professional basketball players' future performance and being selected in an All-Star game (Nguyen, Nguyen, Ma & Hu, 2021).

In addition to detecting player motion and predicting match results, machine learning has also been utilized to predict shot success in Table Tennis (Draschkowitz, Draschkowitz & Hlavacs, 2014). In this disclosure, Draschkowitz extracted features like length and direction of strokes from the videos and trained classifiers to predict shot success and failure. After training, these classifiers are capable of predicting the success of strokes for a particular game and player and thus allows players and coaches to adapt to strategies more suitable to specific players.

On the other hand, previous studies have also commented on the inconsistency of referee decision in competitive sports. In Influence of crowd noise on soccer refereeing consistency in soccer (Balmer, Nevill, Lane & Ward, 2007), researchers investigated the effect of home crowd on referees. Balmer's research in 2007 found a significant imbalance of decisions in favor of the home side when crowd noise is present. Although the difference of home and away players for squash is less conceivable compared to soccer, many times the crowd could favor a player over another which may impose similar effects to the refereeing official. Furthermore, studies have surveyed the empirical literature on the behavior of referees in professional football and other sports, and have found that a number of studies have shown that referees favor the home team in football, basketball, or baseball (Dohmen & Sauermann, 2016). On the other hand, a disclosure in 2018 investigated basketball referee's decisions on potential offensive foul situations, and in fact has found no evidence of favoritism granted to the home team, to star players, or to high-reputation teams, or of small players being tackled by significantly larger opponents (Morgulev, Azar, Lidor, Sabag & Bar-Eli, 2018).

To acquire data for this disclosure, a similar approach to the disclosure Using a *Situation Awareness approach to determine decision-making behaviour in squash* (Murray, James, Perš, Mandeljc & Vučković) is taken. In the above disclosure, the researchers investigated the strategic nature of many shots in squash. Forty-one professional matches were recorded and every shot excluding serves, return of serves and rally ending shots was analyzed and four values are calculated from the video: Time between player A's shot and player B returning the shot (Time), Distance player B moved to return player A's shot (Distance for B), Maximum velocity of player B from the moment player A hit the shot to player B returning the shot (max speed for B), and the distance player B was from the T at the moment player A hit the shot (Bdistance from T).

Through cluster analysis of the four values, six shot types (attempted winners, attack, pressure, pressing, maintain stability, defense) are developed, differentiated through magnitudes of the four values. For example, if the Distance From T exceeds 2.6 meters, Time exceeds 1.7 s, Distance exceeds 4.0 m, and Speed exceeds 3.6 m/s, the shot is classified as the most threatening "attempted winners." Using the metrics, the researchers are able to categorize the strategical usage of every shot that has been played in the forty-one matches.

Through analyzing video footage and collecting numerical data, Murray's research team was able to find meaningful results regarding the strategic purpose of different types of shots. This disclosure proposed to use similar methods of data collection, in other words, analyzing video footage and collecting numerical data.

Objectives of this Disclosure

The objective of this disclosure is to investigate if machine learning can be applied to predict squash referee decisions. As the current measures in place (decisions by human) are causing controversies, this disclosure wants to explore the possibility of decisions by machine learning, and if possible, develop a model that can be utilized to perform real-life decision making in a squash match
Materials
Data Collection
The PSA YouTube Channel As this disclosure aims to train a model able to perform real-world decision making, the data are collected from real-world decisions as well. As there are no public datasets available for this purpose, we collected data and constructed a dataset from scratch.

The PSA Youtube Channel uploads publicly available squash matches played by the best professional players in the world, and we had reviewed those videos to collect our data (Professional Squash Association, 2012). Over the course of this disclosure, more than twenty hours of footage has been reviewed and 400 decisions have been collected from these publicly available matches. Each decision, depending on the complication of the situation, can take three to five minutes to label. More than twenty-five hours were spent labeling the interferences for this disclosure.

The Definition of "Moment" and Six Data Points

In reality, interference happens dynamically. In some interferences players collide and stop moving, and in some interferences players try to move through after contact. As using video for input in machine learning is extremely challenging computationally and might not work for the purpose of this disclosure, we collected positional data from the video after limiting the video into one single frame, or, a "moment," which is defined to be the moment when the player first collide, or the moment the ball entered the attacking player's reach.

After a moment is selected, six data points are collected from the frame: the Attacking Player's Position, the Retreating Player's Position, the Ball's Position in the frame, the Ball's Projected First Bounce, the Ball's Projected Second Bounce, and the Attacking Player's Racket Head Position.

To collect those data, we used the tool Digitizeit. Inside Digitizeit, a top-down view of a standard squash court is uploaded. The x-axis and the y axis are defined to begin at the bottom left of the squash court. A standard squash court's dimensions are 6.40 meters in width and 9.75 meters in length. The x-axis ranges from 0 (meters) to 6.40 (meters), and the y-axis ranges from 0 (meters) to 9.75 (meters). FIG. 4. shows a screen shot of the tool Digitizeit.

Figure 5:
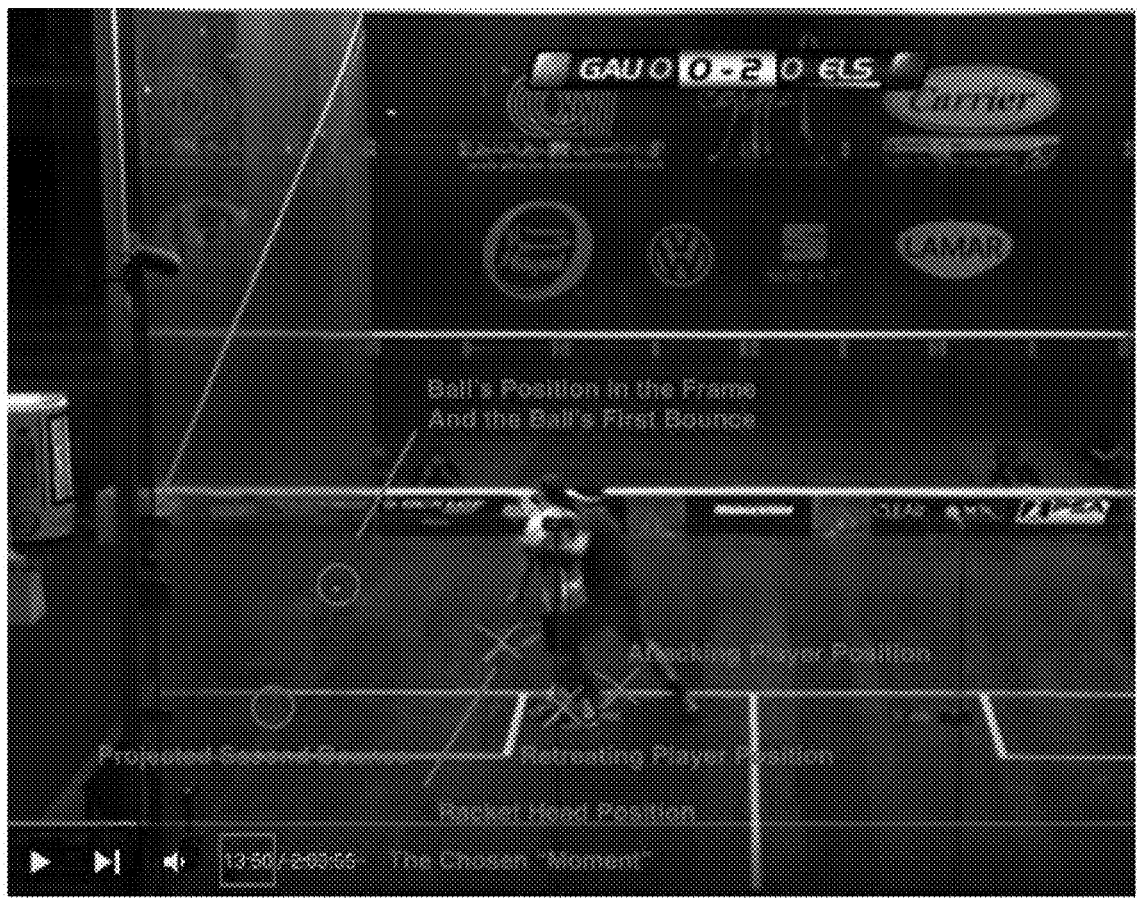
FIG. 5 illustrates a video frame corresponding to Data #3 in the dataset of the present disclosure.
Figure 6:
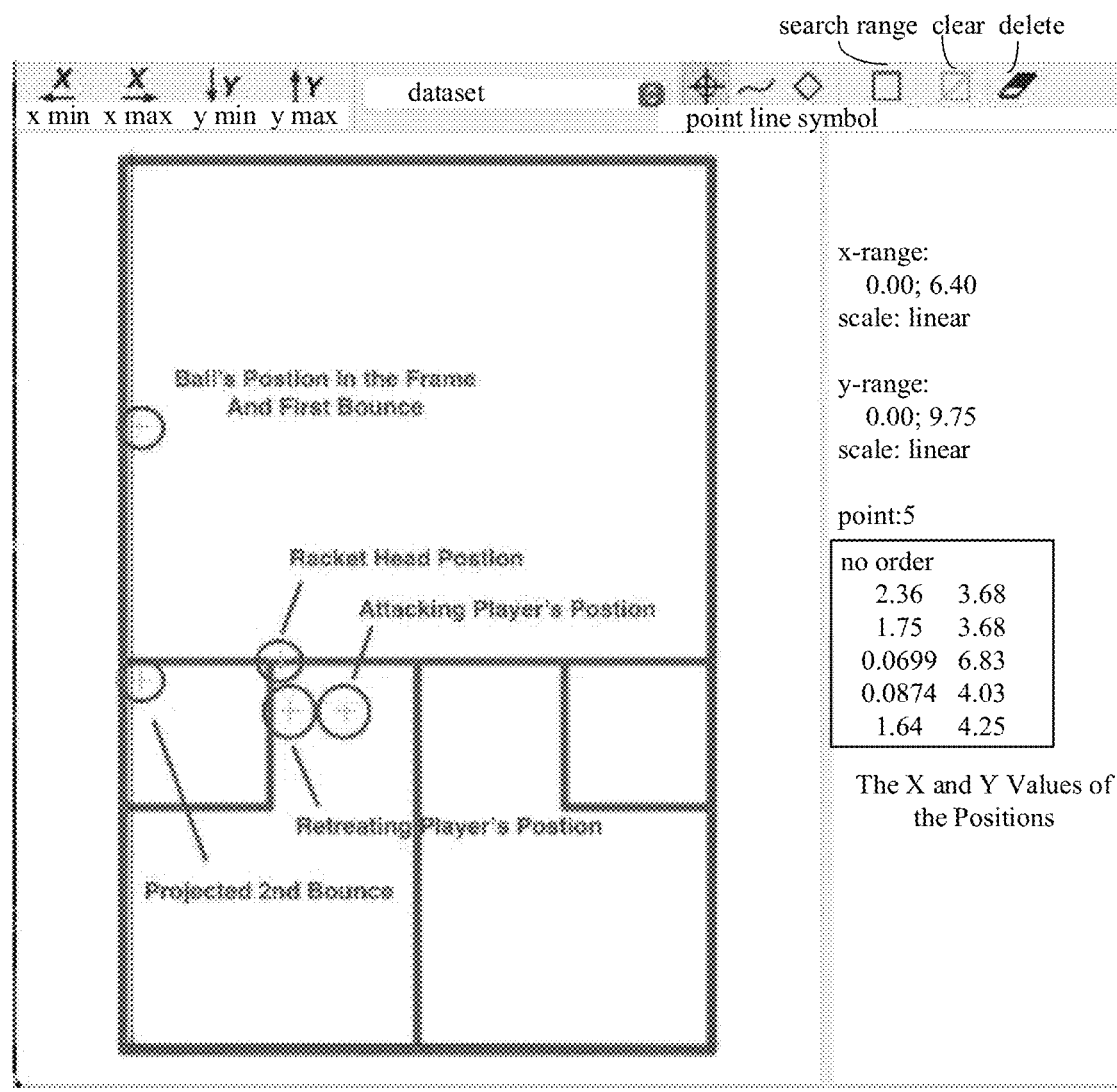
FIG. 6 illustrates a Labeling for Data #3 in the relevant tool Digitzeit.

To collect the six data points, we plot a point on the graph of the squash court, and Digitizeit will label its X and Y values. Those values are then collected into our dataset together with the final decision. For instance: FIG. 5 illustrates Data #3, Gaultier/Elshorbagy 2014 ElGouna 13:50 YesLet (SQUASHTV, 2014). The above format means: The Data Labeled "3" in our dataset. Taken from the match between Gregory Gaultier and Mohamed Elshorbagy in the 2014 ElGouna Championships. We adopt similar formats for subsequent FIGS. illustrating different data. The interference happened at 13:50 in the video. The final Decision is: Yes Let. FIG. 6. Labeling for Data #3 in the tool Digitizeit.

Figure 7:
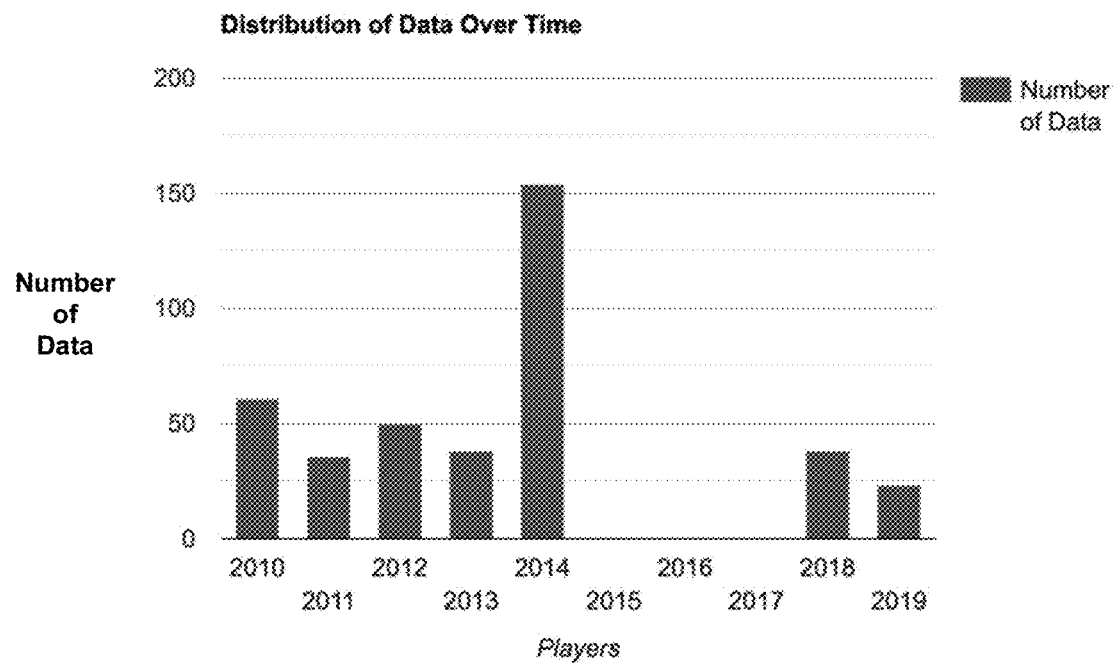
FIG. 7 illustrates distribution of data over time.

Data Distribution 400 decisions have been collected for this disclosure, ranging from multiple years and from multiple world-class players. FIG. 7 illustrates a distribution of Data over Time.

Figure 8:
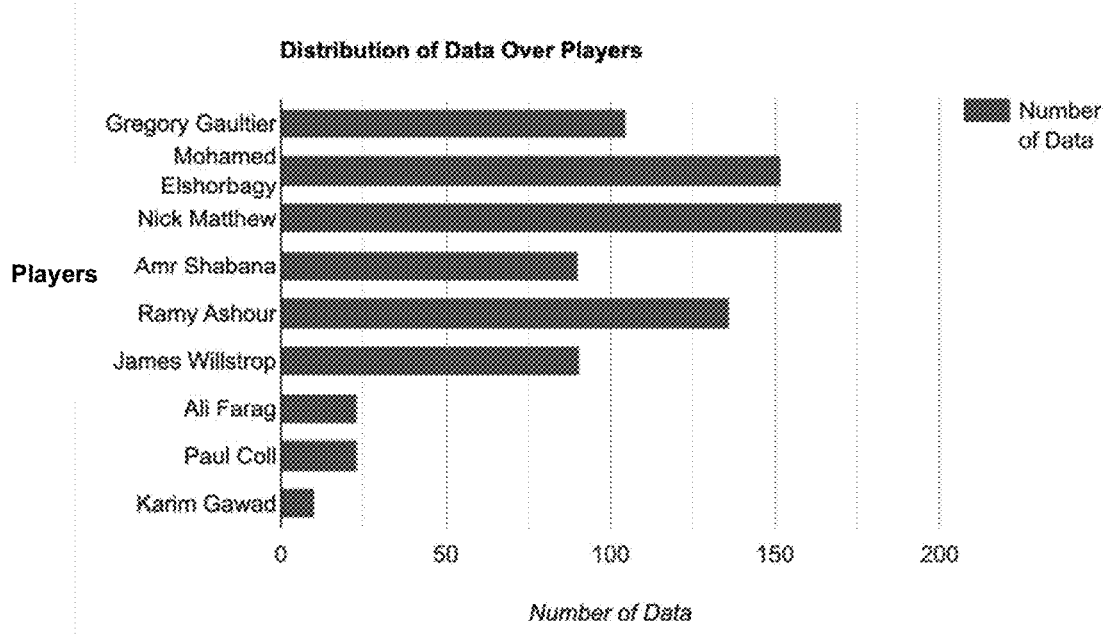
FIG. 8 illustrates distribution of data over players.

The refereeing standard has shifted over the past decade. With awarding more strokes and punishing more no lets, the PSA intends to encourage less stoppages due to minimal interferences and more continuous plays. Such an effect was visible when reviewing matches from 2018 and 2019. Most of the data in this disclosure are taken from 2010 to 2014, approximately when the video review system was available (2011-2014) and when the refereeing standard was approximately consistent (PSA World Tour, 2011). FIG. 8. illustrates a Distribution of Data Over Players.

Due to factors such as the style of play, body strength, shot selection, dominance in the center of the court, and movement style, some players might be involved in more interference than others. This disclosure aimed to collect approximately similar numbers of decisions from the players involved.

Figure 9:
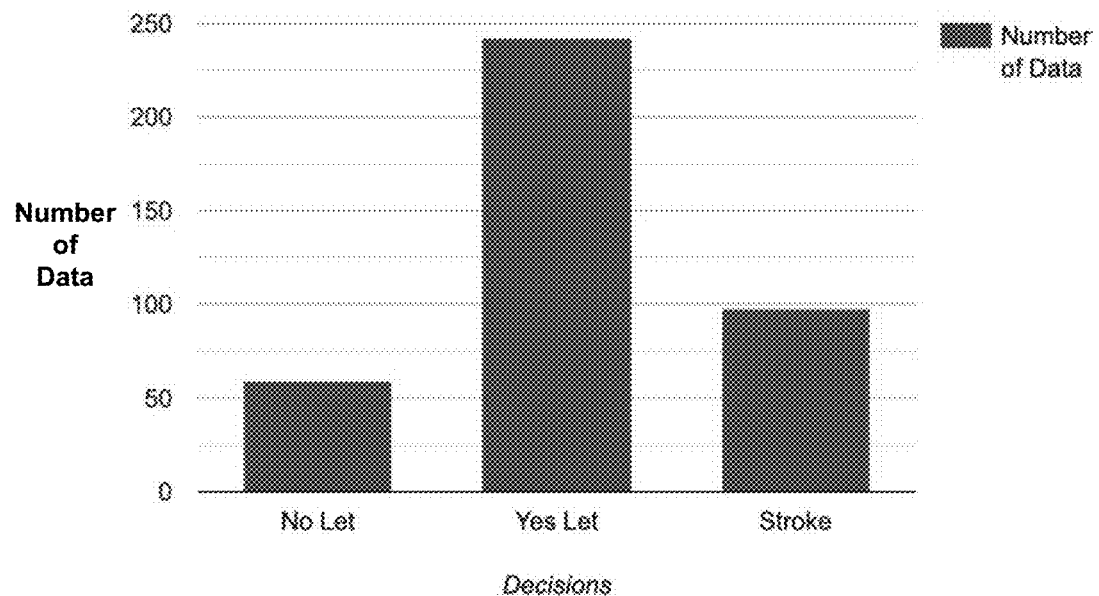
FIG. 9 illustrates number of each decision.

The involved players are all among the best in the world. All had reached world number one at some point in their career and are all winners of major titles for squash. FIG. 9 illustrates a number of each decision.

Due to the nature of the game, in any given match there are more decisions ending in Yes Let than decisions ending in Stroke and No Let. Due to time constraints we collected as many decisions as we could instead of discarding Yes Lets in search of No Lets and Strokes. As a result, our dataset consists of 59 (14.75%) No Lets, 243 (60.75%) Yes Lets, and 98 (24.5%) Strokes.

Methods

Python, Tensorflow, and Wolfram Mathematica

This disclosure will use two programming platforms to train the model: Python and Wolfram Mathematica.

The rationale in selecting Python is because it grants the ability to make many modifications to our model, including the Network layers, nodes, different methods and functions, etc. The Tensorflow package constructs model layers with ease and provides freedom in modifying and fine-tuning the model. The combination of Python and Tensorflow has been widely used to train machine learning models. A disclosure in 2019 used Tensorflow and achieved competitive performance results in classifying Breast Cancer Malignancy (Chang & Chung, 2020). A disclosure in 2021 used Tensorflow and compared artificial neural networks and convolutional neural networks in image classification tasks (Kompella, Likith Vishal, Sivalaya, 2022).

Wolfram Mathematica, on the other hand, is easy to program and provides useful visualizations for model performances. Previous studies have successfully used this tool to train powerful models. A disclosure in 2022 used the Wolfram Mathematica's system and developed an algorithm for localizing car license plates (Gundina & Zhdanovich, 2022). A disclosure in 2021 used Wolfram Mathematica and produced Covid-19 projections by using a machine learning method with cumulative data for confirmed infected patients, deaths and vaccinated patients in Mexico during 2021 (Ortigoza & Zapata, 2021).

The result of this disclosure will, therefore, be separated into the Python section and the Wolfram Mathematica section.

Neural Network

Figure 10:
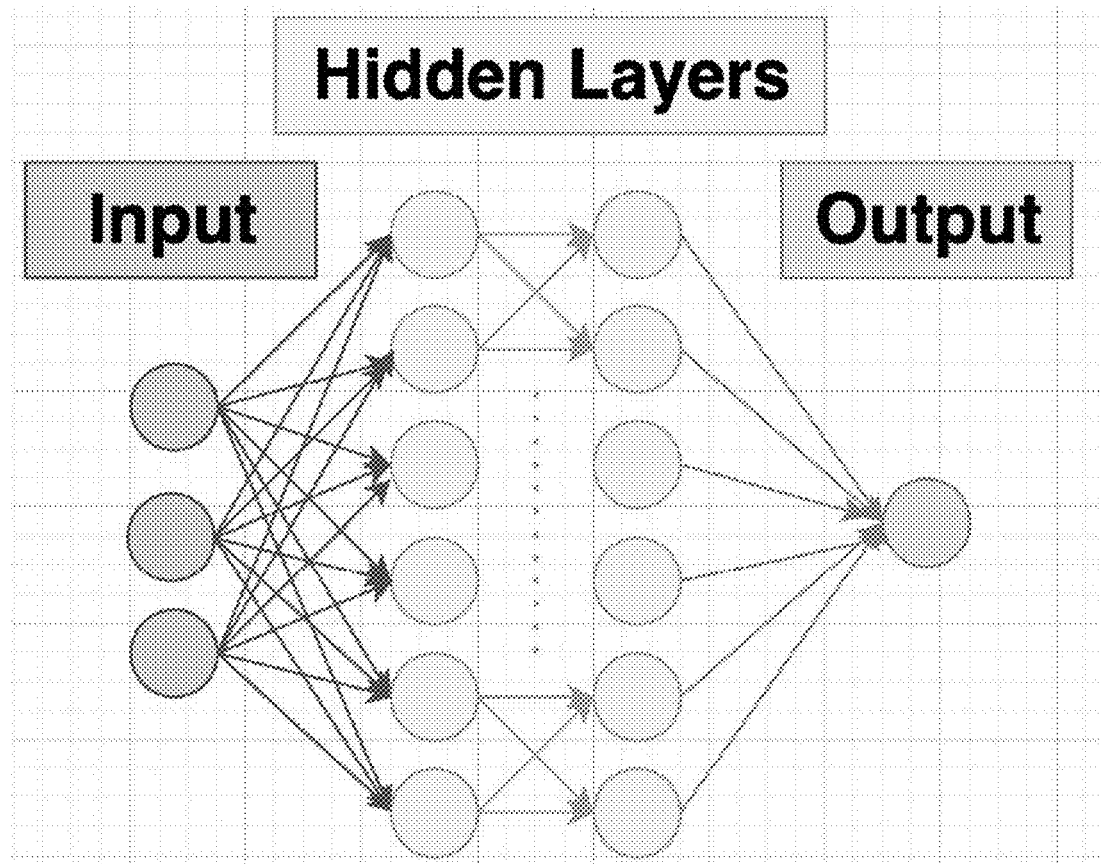
FIG. 10 illustrates a neural network's structure.

This disclosure will implement machine learning through Neural Network. Neural Networks are machine learning algorithms inspired by the human brain and simulate the connection between neuron cells. Through layers of fully-connected nodes, with each node performing a simple calculation task of multiplication and addition of parameters, the inputs go through numerous calculations and reach a final value, or the intended answer. After being trained using a large amount of data, a neural network can perform classification or clustering tasks in a very short period of time. FIG. 10 is an illustration of a Neural-Network's structure.

Normalization

To pre-process the dataset, this disclosure will explore the technique of normalization. Normalization is a technique often used in machine learning to set a common scale for data with different ranges and measures. For this disclosure specifically, although all X-values share a common measure (0 m to 6.4 m) and all Y-values share a common measure (0 m to 9.75 m), it will be worth exploring whether the difference in two axis could be normalized and allow the model to perform better.

Selection from 6 Data Points

As there exists many complicated reasons as to why a situation results in a decision, a neural network may be unable to learn all the relations between all data values. Dropping out some less meaningful data may in fact help the model to perform better, as some too much information could act as a noise to the model and impede its improvement.

Modified Data Points

We hypothesized that the initial 6 data points (or, the Primitive Data) would not be enough to achieve the accuracy needed in real-life squash refereeing. There are more than six factors that decide what should be the right decision for an interference. Therefore, we decided to calculate a second layer of data using the primitive data we have acquired. The second layer of data may be able to provide more insights into why and how a situation is considered one of the three decisions. More specifically, we used the primitive data and calculated 9 more values which we think can provide useful information. Each of the second layer of data are explained below:

Distance of Attacking Player (AP) to Retreating Player (RP)

The distance between two players is calculated simply through pythagorean theorem.

Figure 11:
FIG. 11 illustrates a video frame corresponding to Data #402 in the dataset of the present disclosure.
Figure 12:
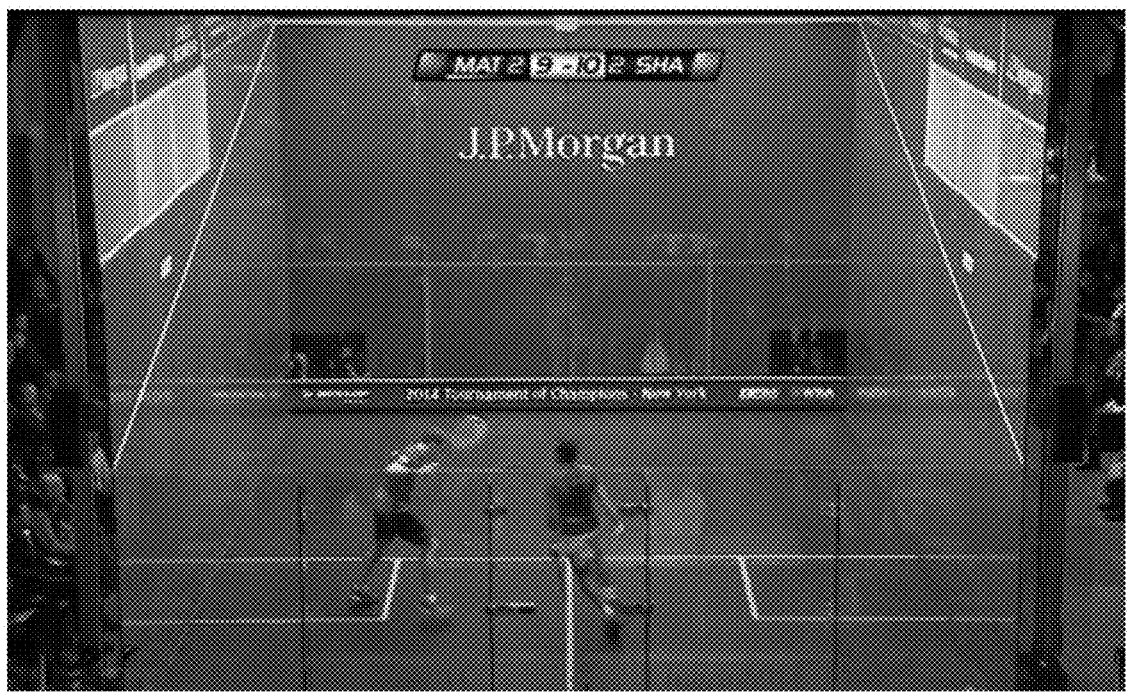
FIG. 12 illustrates a video frame corresponding to Data #92 in the dataset of the present disclosure.

This value is included because how close the players are may affect how the decision is made, especially in situations where no physical contact is presented but the ability to play the ball is impeded. This value may provide less useful information in cases where physical contact is presented, as in those situations the distance tends to be short as the players' bodies have made contact. FIG. 11 illustrates Data #402 (The data is labeled #402 because the dataset's labels start at #2. This is the last data in the dataset.), Gawad/Willstrop 2018 Grasshopper 1:02:48 Stroke (SQUASHTV, 2020). FIG. 12 illustrates Data #92, Matthew/Shabana 2014 Tournament of Champions (ToC) 1:35:10 Yes Let (SQUASHTV, 2014).

The above two cases are a great demonstration of how distance between players can cause the decision to change. In both scenarios the player location and the ball locations are similar, yet the former is decided a Stroke and the latter a Yes Let. This is because in the first scenario the two players are very closely positioned. If the attacking player was going to play the ball he would likely strike his opponent. Therefore, a stroke is awarded to the attacking player. In the second scenario there is more space between the two players, and the attacking player would have space to hit the ball without hitting his opponent. Therefore, the referees deemed the situation as Yes Let.

Distance of Attacking Player to Ball Position in Frame

The distance of AP to Ball provided useful information in making decisions. If the ball is close to the AP, there is more possibility of the decision being a stroke; the further the ball is to the AP, there are more chances of the decision being a no-let. The distance can be a good indicator of the attacking player's ability to play the ball. There are less chances of no-lets if the attacking player is ready to play the ball instead of still being on the way to the ball.

Figure 13:
FIG. 13 illustrates a video frame corresponding to Data #4 in the dataset of the present disclosure.

However, the ball position may not be a good indicator of where the player will play the ball. In situations where the ball travels to the back of the court and the interference happens when the ball is in the middle, the distance of AP to Ball can provide information of where the player will be playing the ball. In situations where the ball stays up in the court, the distance of AP to Ball can be misleading because the Ball Position in Frame will travel towards the player and ends at the Second Bounce Position. In this case, where the player will play the ball is closer to the player than the Ball Position in Frame is, and the distance of AP to Ball will be exaggerated. FIG. 13 illustrates Data #4, Gaultier/Elshorbagy 2014 ElGouna 19:57 YesLet (SQUASHTV, 2014). The above situation is a case where this information can be a useful tool as the Ball Position in Frame is very close to where the player is going to play it. The Distance therefore provides insights to the player's ability to get to the ball.

Figure 14:
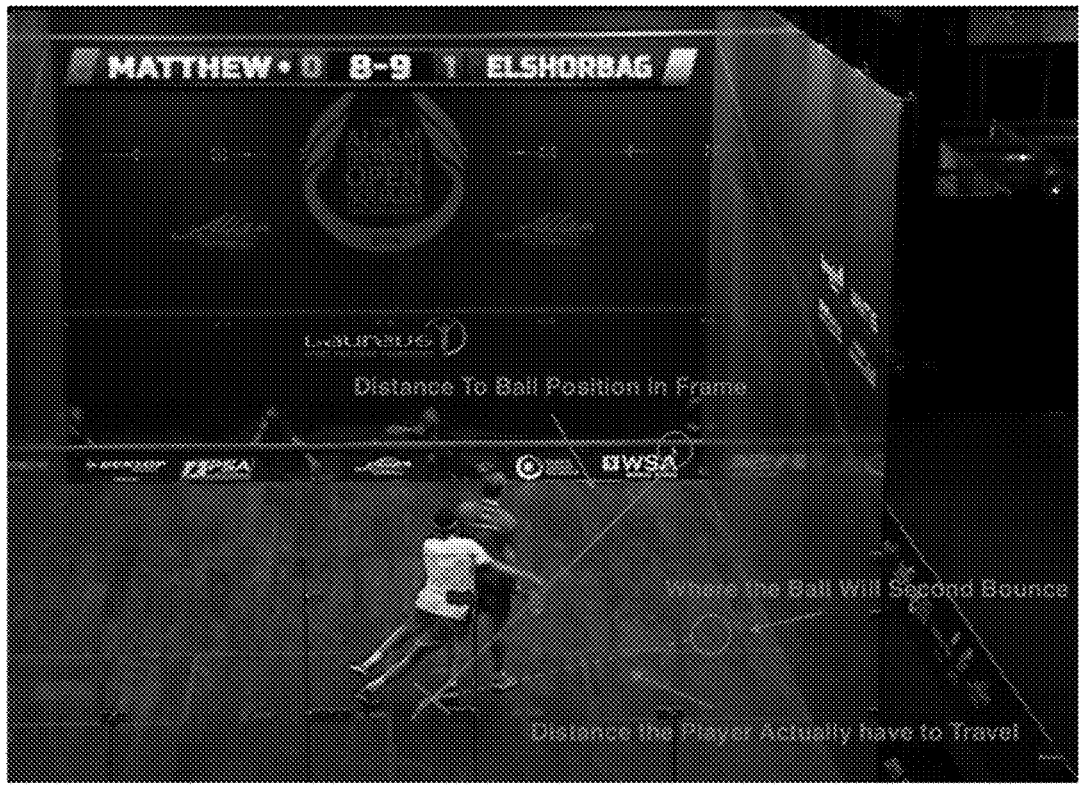
FIG. 14 illustrates a video frame corresponding to Data #39 in the dataset of the present disclosure.

FIG. 14. illustrates Data #39, Matthew/Elshorbagy 2014 British Open 49:11 Yes Let (SQUASHTV, 2014). This situation is a case where the information can be misleading. The ball travels towards the attacking player, therefore the Ball Position in Frame is a lot further than the distance the attacking player actually has to travel.

Distance of Retreating Player to Ball Position in Frame

The Distance of Retreating Player to Ball can provide information about how much the RP is blocking the access to the ball. If the RP is away from the ball, the situation should move away from being decided as a stroke. If the RP is right next to the ball, it shows that the RP is blocking the access to the ball, which would push the decision towards a stroke.

Similar to the Distance of AP to Ball Position in Frame, this value may not be a good indicator of where the attacking player can play the ball. If the Ball Position in Frame is next to the RP but the AP is very far away to play the ball still, the situation can well be considered a Yes Let or No Let. On the other hand, if the Ball Position in Frame is away from the RP but it will eventually end next to the RP, the situation can still be considered a Stroke.

Figure 15:
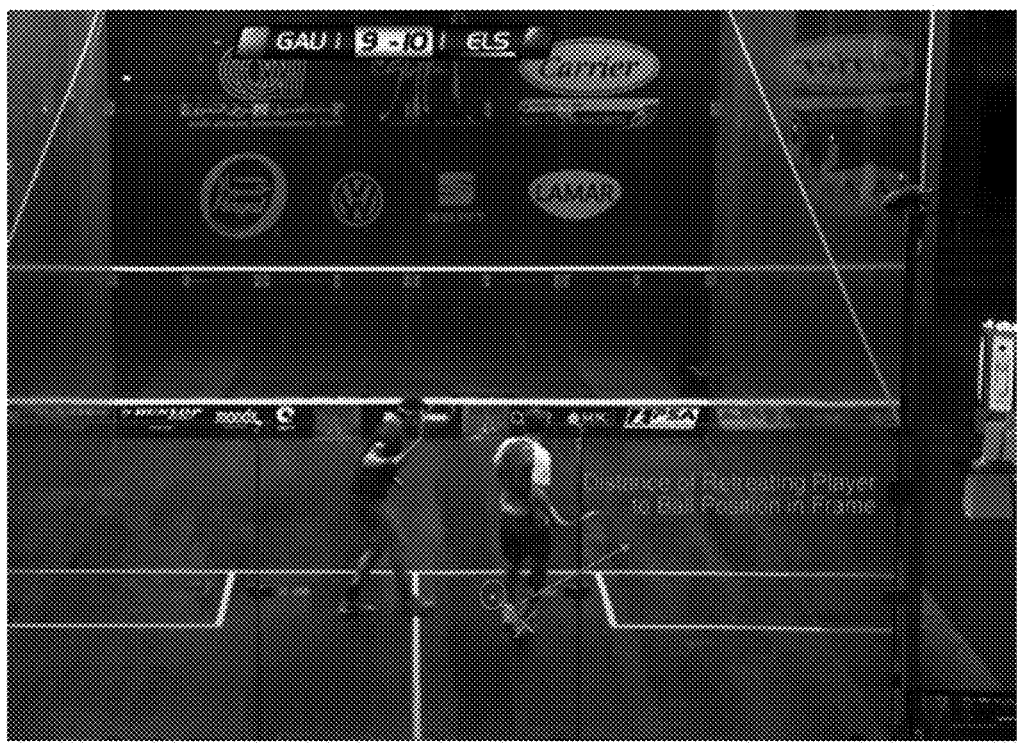
FIG. 15 illustrates a video frame corresponding to Data #25 in the dataset of the present disclosure.

FIG. 15 illustrates Data #25, Gaultier/Elshorbagy 2014 ElGouna 1:42:50 Stroke (SQUASHTV, 2014).

This example shows how the Distance of RP to Ball can be a good indicator if the situation is a stroke. In this case the retreating player accidentally hits the ball back to himself, and the attacking player would have hit him if he attempted to swing at the ball. Therefore, because the Distance of RP to Ball is small, this situation is considered a stroke.

Figure 16:
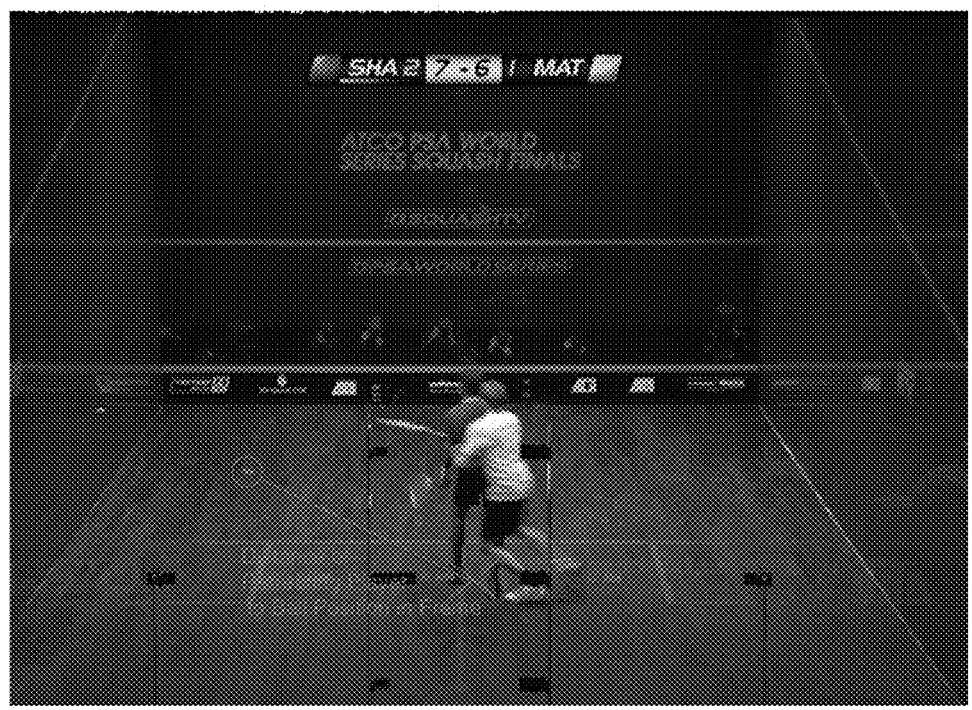
FIG. 16 illustrates a video frame corresponding to Data #364 in the dataset of the present disclosure.

FIG. 16 illustrates Data #364, Shabana/Matthew 2013 World Tour Finals 1:00:33 No Let (SQUASHTV, 2019).

This situation shows that the Distance of RP to Ball can also be an indicator if the situation is a No Let. In this case the RP is very far away from the ball, which suggests that the AP created his own interference by going directly at the RP or the AP could not have reached the ball had there been no interference anyways. In either case the decision would be No Let.

Distance of Attacking Player to Second Bounce

Usually, the referee looks at the second bounce to determine how far away the ball is to the players. Through considering the distance of the AP to the second bounce, we can gain information about how much the attacking player has to move until arriving at a position to play the ball. This value can be very straight forward when the ball remains at the front of the court: the closer it gets to the AP, the more chance it is a stroke.

However, when the ball travels to the back of the court, at some point the ball is closest to the attacking player and it will travel away. Had there been no interference the attacking player will ideally play the ball where it is closest to him instead of following the ball until it second bounced. In this case the Distance of AP to Second Bounce Position again fails to identify the position where the player is going to play the ball.

Figure 17:
FIG. 17 illustrates a video frame corresponding to Data #142 in the dataset of the present disclosure.

FIG. 17 illustrates Data #142, Ashour/Elshorbagy 2012 World Championship 1:30:41 Stroke (SQUASHTV, 2013).

In the case above, the Distance of Attacking Player to Second Bounce can give a strong reason for why the decision is a stroke. Where the ball lands for second bounce is really close to the AP, which means the AP can easily play the shot had there been no interference. Since the retreating player is directly in the way, this is one of the most obvious stroke decisions.

Figure 18:
FIG. 18 illustrates a video frame corresponding to Data #134 in the dataset of the present disclosure.

FIG. 18 illustrates Data #134, Ashour/Elshorbagy 2012 World Championship 1:13:29 Yes Let (SQUASHTV, 2013).

This is a case where the Distance of Attacking Player to Second Bounce is an inaccurate representation of the attacking player's ability to get to the ball. Had there been no interference, the attacking player would have played the ball around the service box. If we consider the distance to the second bounce, the attacking player would be unjustly evaluated for his ability to retrieve the ball, since he only has to move to the service box instead of having to move to the back of the court.

Distance of Racket Head to Retreating Player

If the swing of a player is impeded by the other player and he would be able to play the ball otherwise, a stroke would be awarded to the player. The Distance of Racket Head to Retreating Player aims to capture this aspect of decision making. If the Racket Head is close to the Retreating Player and the Ball is close to the Attacking Player, the situation will likely be a stroke.

Figure 19:
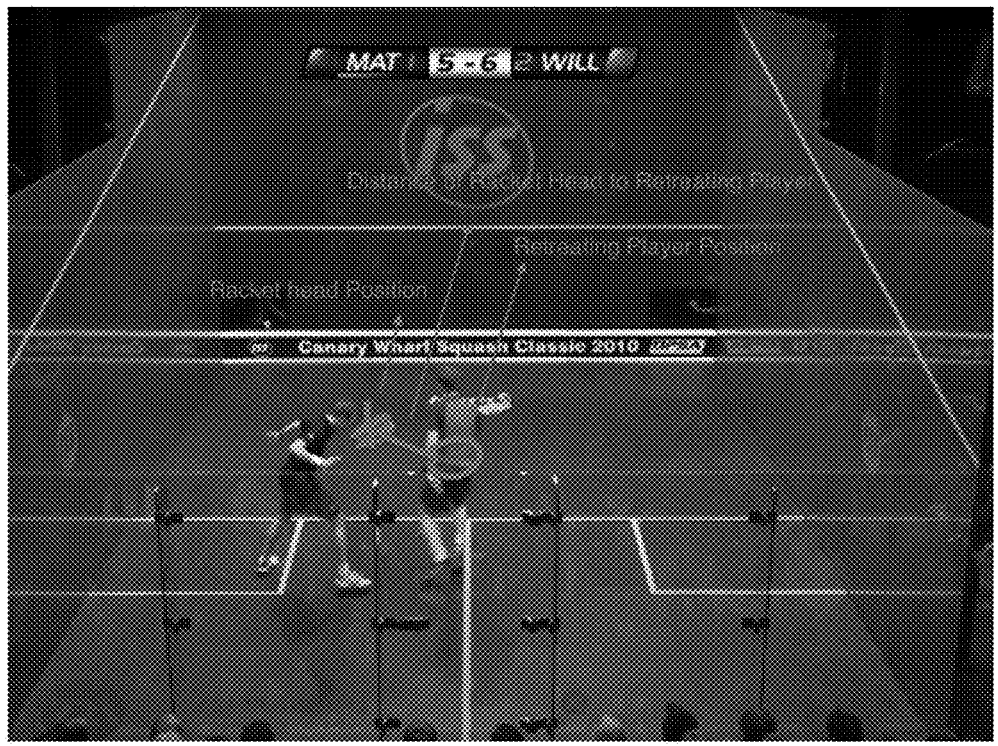
FIG. 19 illustrates a video frame corresponding to Data #192 in the dataset of the present disclosure.

FIG. 19 illustrates Data #192, Matthew/Willstrop 2010 Canary Wharf 1:41:18 Stroke (SQUASHTV, 2013).

This is an example of the Racket Head being too close to the Retreating Player and the referee deemed the situation a stroke. Had the AP swung at the ball, the RP would likely have been hit. After all, this distance provides similar information to the Distance of AP to RP, but we hypothesize that this may provide a more accurate value.

Distance of the Ball Position in Frame to Second Bounce

The referee considers an idea of "quality of shot." If there is interference yet the shot is "too good," the referee would make the decision of No Let. This value aims to present information about how good the ball is. The Distance of Ball Position in Frame to Second Bounce shows how far the ball travels before it dies, therefore indirectly provides information about how much time the player has to retrieve the ball if there has been no interference, or, the "time remaining". If the contact happened but the ball died right away, the attacking player could not have gotten to the ball even if there wasn't any interference. On the other hand, if there is still lots of time until the ball dies after the interference, the situation is likely a Yes Let.

Figure 20:
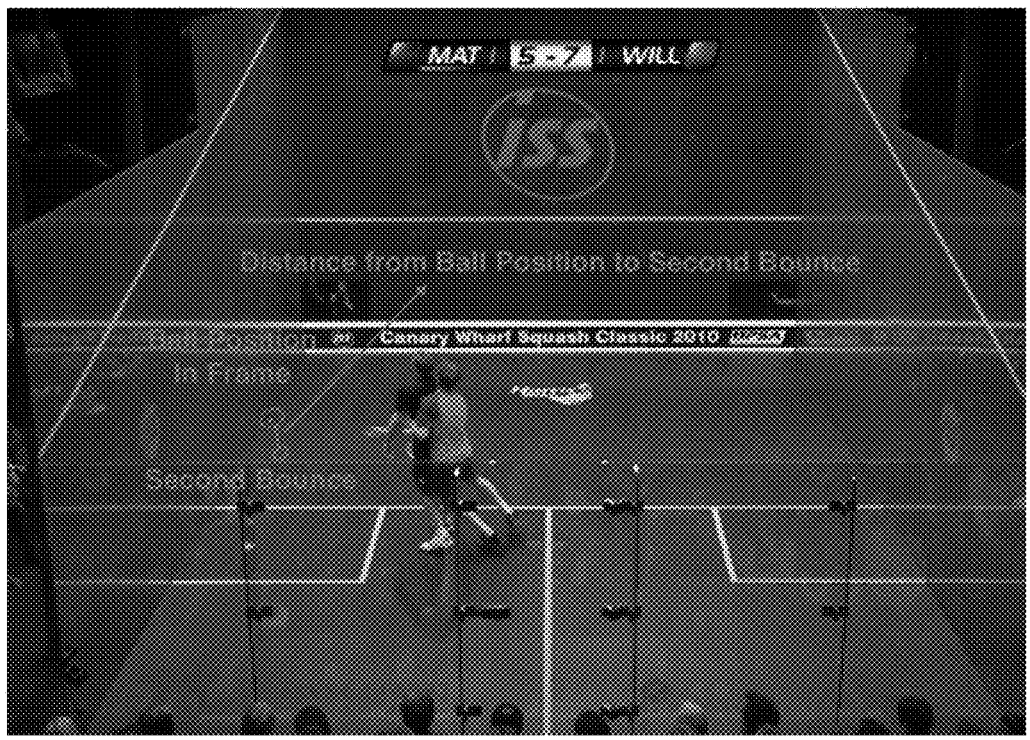
FIG. 20 illustrates a video frame corresponding to Data #167 in the dataset of the present disclosure.

FIG. 20 illustrates Data #167 Matthew/Willstrop 2010 Canary Wharf 1:02:50 No Let (SQUASHTV, 2013)

This is a situation demonstrating how this information can be used to determine No Let. As the ball hits the "nick" on the first bounce (The "nick" is the corner between the floor and the wall. When a ball lands in the nick, energy is taken away and it can die very quickly), the ball stays very short, which leaves no time for the attacking player to retrieve the shot.

Because the Distance of Ball Position to Second Bounce is short, the referee deemed the situation a No Let as the AP couldn't reach the ball even if there wasn't any interference.

Distance of Racket Head to Ball Position in Frame

This value provides similar information to Distance of Attacking Player to Ball Position in Frame. We included this information because sometimes the reach of the player can be long enough to reach the ball even when their body is more than a meter away. The Racket Head Position may provide more useful information about the attacking player's ability to play the ball than the attacking player position.

Figure 21:
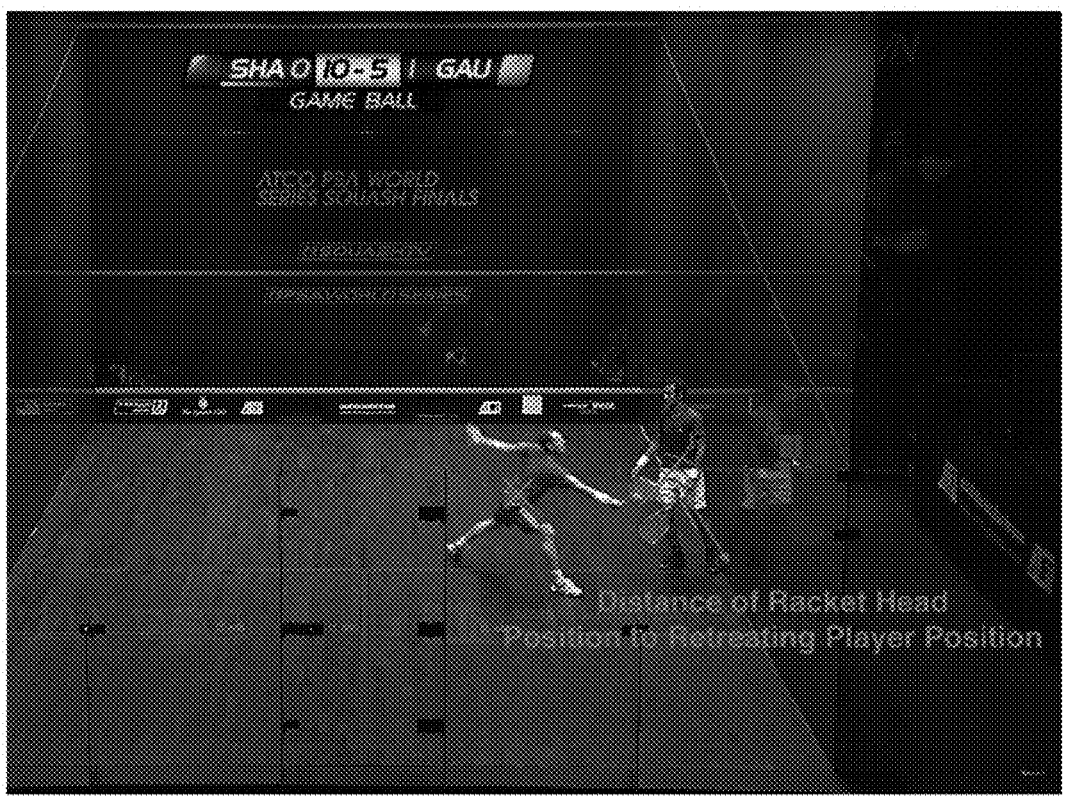
FIG. 21 illustrates a video frame corresponding to Data #214 in the dataset of the present disclosure.

FIG. 21 illustrates Data #214, Shabana/Gaultier 2011 World Series Finals 33:09 Stroke (SQUASHTV, 2013).

This case provides an example of why the Distance of Racket Head to Ball Position may provide a better notion of the attacking player's ability to play the ball than the Distance of Attacking Player to Ball Position. In this case, the AP's racket head is very far away from his body. He is fully stretched and can strike a ball that is more than one and a half meters away from him. In this case, simply calculating the Distance of AP to Ball may provide a false sense that the AP is still some distance away from the ball. Therefore we decided to include this value.

The Shortest Distance from Racquet Head to the Path of Ball

For multiple values described above, the limitation of "not able to identify where the AP is going to play the ball" exists. This value aims to resolve this issue by calculating the shortest distance from the path of the ball to the attacking player's racket head. The path of the ball is defined to be the straight line segment from the Ball Position in Frame to the Second Bounce Position. A line perpendicular from the ball path originated from the Racket Head Position is calculated. If the point intersecting the ball path exists on the Ball Path (as the ball path is a line segment and could end before the intersection happens), we calculate the distance from the Racket Head Position to the intersection. If the intersection does not exist on the line segment, we take the closest ending point (either Second Bounce or Ball Position) on the line segment and calculate the distance from it to the racket head position.

Figure 22:
FIG. 22 illustrates a video frame corresponding to Data #283 in the dataset of the present disclosure.

FIG. 22 illustrates Data #283 Gaultier/Ashour 2013 British Open 22:55 Yes Let (SQUASHTV, 2016).

This is an example of the shortest distance to the ball's path. If there was not any interference, the AP would have chosen to approach the ball through the path with the shortest distance (which is the line perpendicular to the path) instead of going all the way where the ball bounces.

Figure 23:
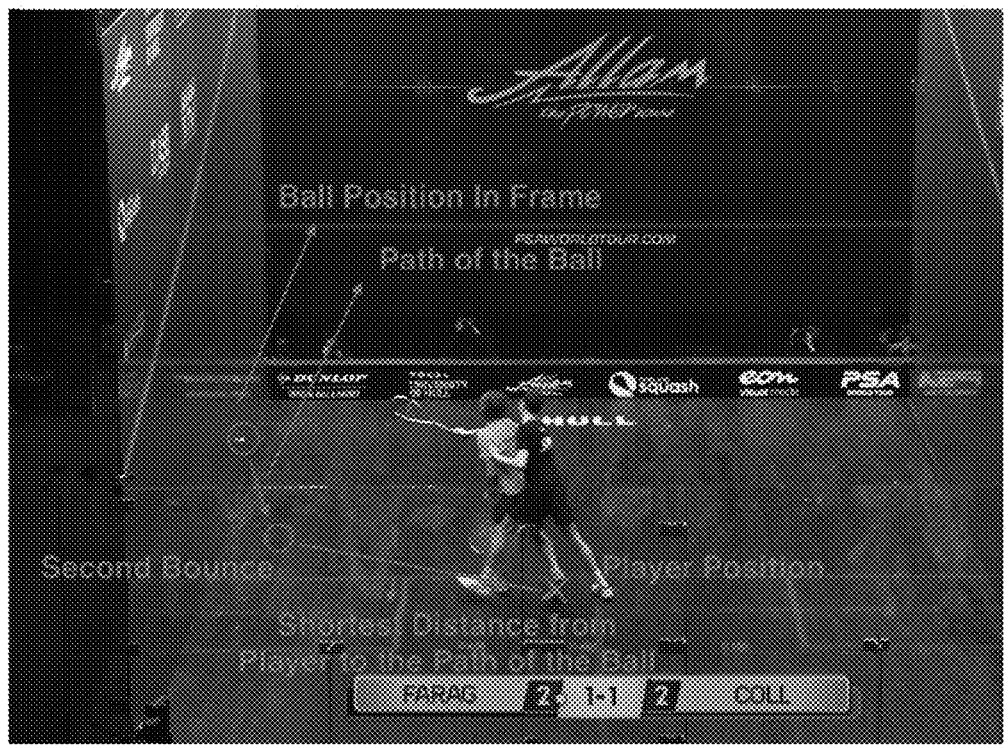
FIG. 23 illustrates a video frame corresponding to Data #390 in the dataset of the present disclosure.

FIG. 23 illustrates Data #390 Farag/Coll 2019 British Open 1:05:40 Yes Let (SQUASHTV, 2019).

In this case, the shortest distance to the path of the ball is simply the distance to the Second Bounce Position. Because the perpendicular line to the ball's path originating from the AP Position doesn't intersect with the line segment (doesn't exist on the path), we take the closest ending point of the segment (either Ball Position in Frame or Second Bounce Position) as the closest point.

Access to the Front Wall: How Much is Blocked by the Other Player

When the RP blocks the AP's access to the front wall, the situation is considered a stroke. This rule is sometimes compromised when the blockage is little or the AP isn't able to make shots due to the speed or the position of the ball. Although it is not a clear-cut situation, a significant blockage of the front wall would be still considered a stroke. We calculated the Blockage through drawing lines from the AP to both sides of RP offsetted by the player's body width and analyzing where the lines meet the front wall. For this disclosure we defined the body width to be 80 cm, as the average shoulder width for men is around 40 cm and we add 20 cm of width to the total width, due to the arm and the leg on each side (Saini, 2023).

Figure 24:
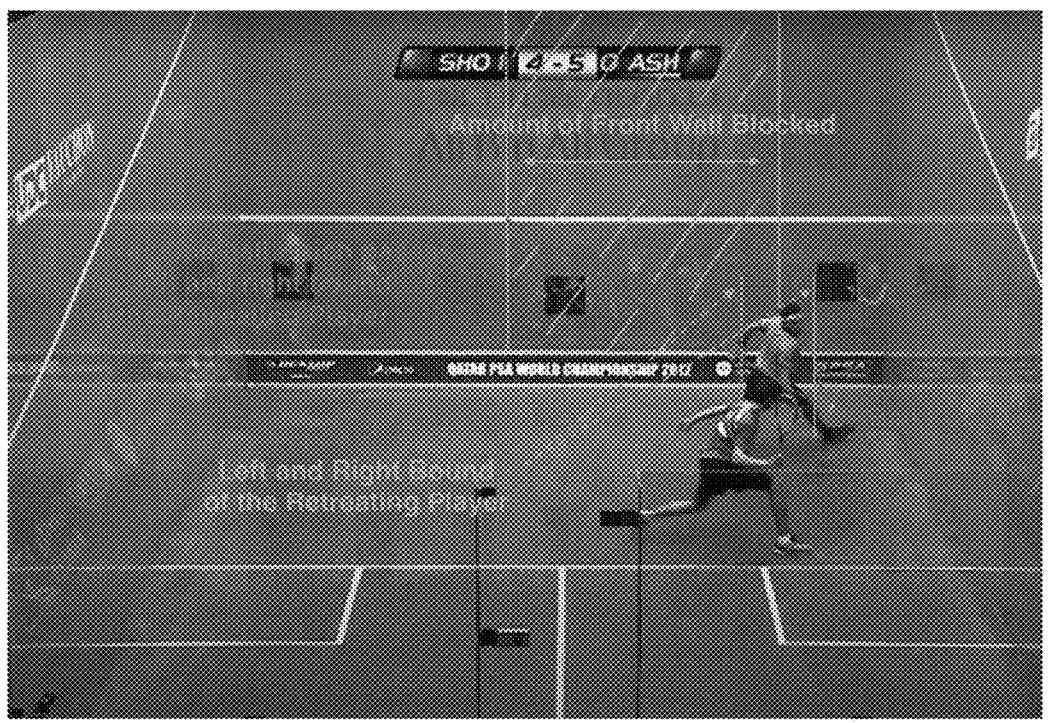
FIG. 24 illustrates a video frame corresponding to Data #118 in the dataset of the present disclosure.

FIG. 24 illustrates Data #118, Elshorbagy/Ashour 2012 World Championship 23:16 Stroke (SQUASHTV, 2013).

This is an example of how the Amount of Blockage on the front wall is calculated. Two imaginary lines are drawn from the ball passing the bounds of the RP and reach the front wall. The Final Blockage is the width of the area (Labeled in Pink) inside those two lines.

Results

Results with Mathematica

Experimental Design

Out of the 400 decisions, 60 decisions are taken out as the test set and 340 remain as the training set. The dataset is shuffled before the test set is taken out. As the dataset is small in number and each shuffle may cause big percentile change to the testing set, every experiment will be done five times to have a better understanding of the average model performance.

Model Performance on Primitive Data

Training on all Six Data Points

Figure 25:
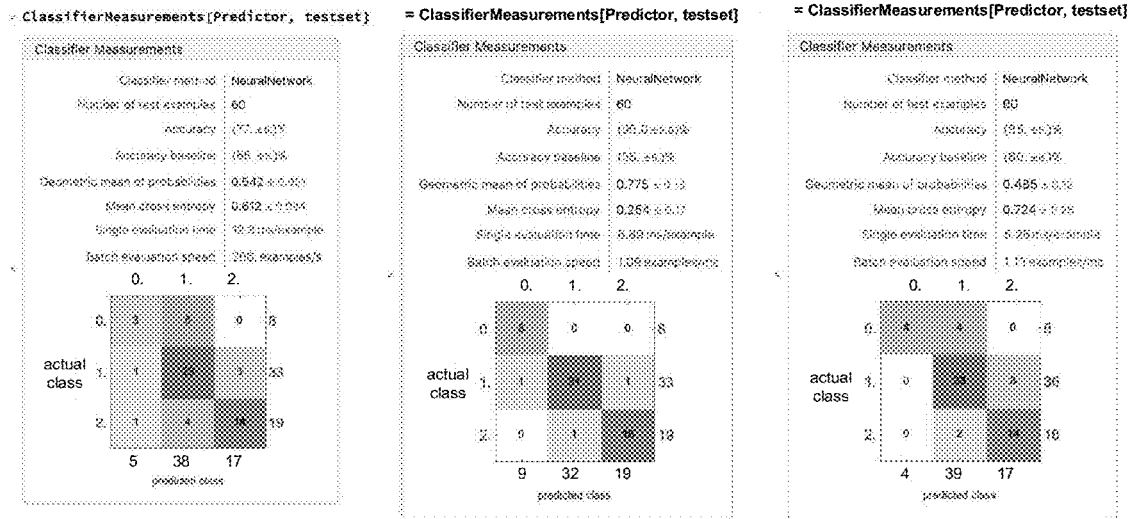
FIG. 25 illustrates three trials of models trained on all six data points.
Figures 51, 52A:
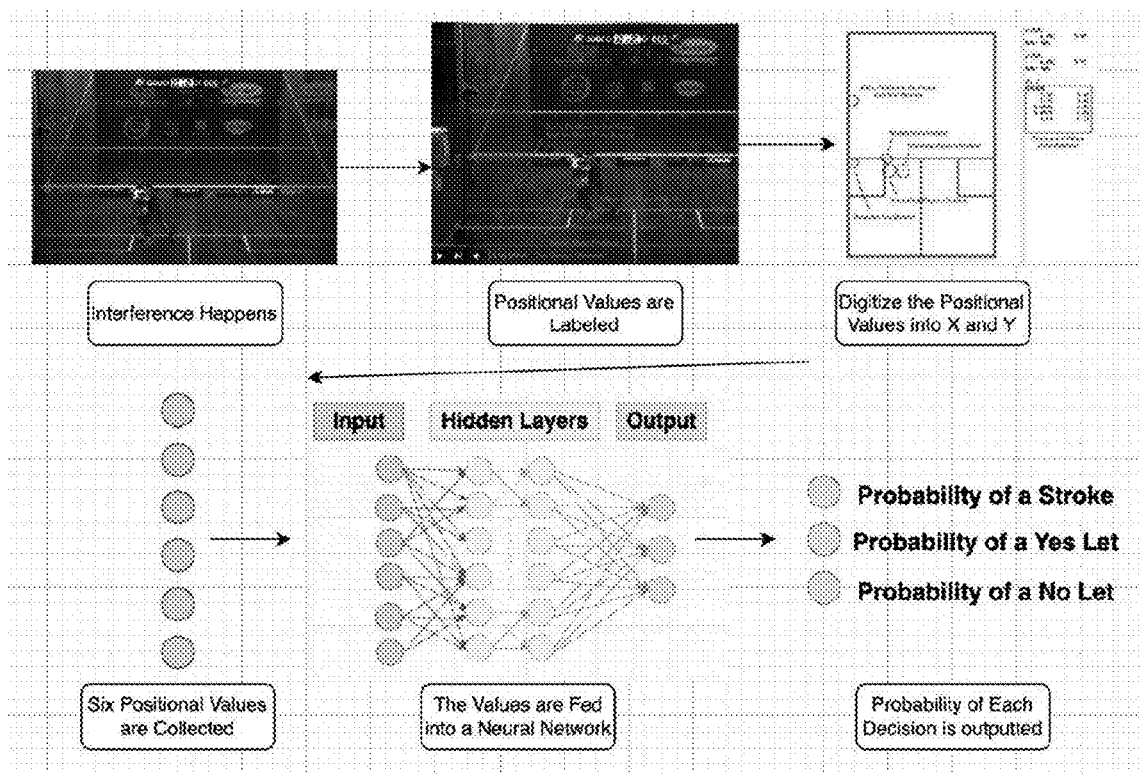
FIG. 51 is a block diagram illustrating a procedure related to the present disclosure.
FIG. 52A-52J respectively illustrate some trials of models trained on different configurations of data points.

FIG. 25. illustrates three trials of models trained on all Six Data Points (for remaining two trials see FIG. 52A).

As the result shows, the accuracy varies drastically over the five runs. The highest accuracy reached 95% and the lowest fell down to 70%. Over all, the five runs averaged to an average accuracy of 81.4%±8.36%. Over the five runs, the distribution of the randomized data is relatively consistent: 8 no lets, 33-36 yeslets, and 16-19 strokes. The models are able to accurately classify yes lets, and relatively easy to classify strokes. Most models struggle with classifying no lets.

Worth noting, in every model the values of no let being classified as stroke and stroke classified as no lets are mostly 0, with the greatest not exceeding 2. This shows that there is in fact a clear divide in strokes and no lets, and such a difference can be detected with the neural network.

Dropping Out Data

As only the positional values are inputted, some values may act as a noise to the model and in fact cause the model to perform worse. We kept the Attacking Player Position, the Retreating Player Position, and the Ball Position in frame, then investigated the effect of dropping out combinations of the remaining values.

Dropping Out Racket Head Position

Figure 26:
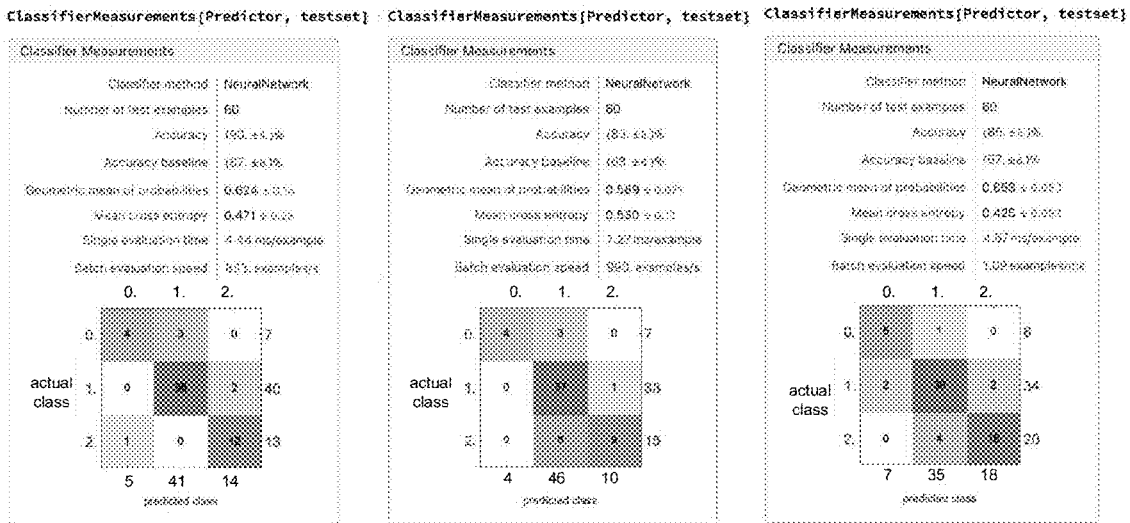
FIG. 26 illustrates three further trials of models trained on all six data points.
Figure 52B:
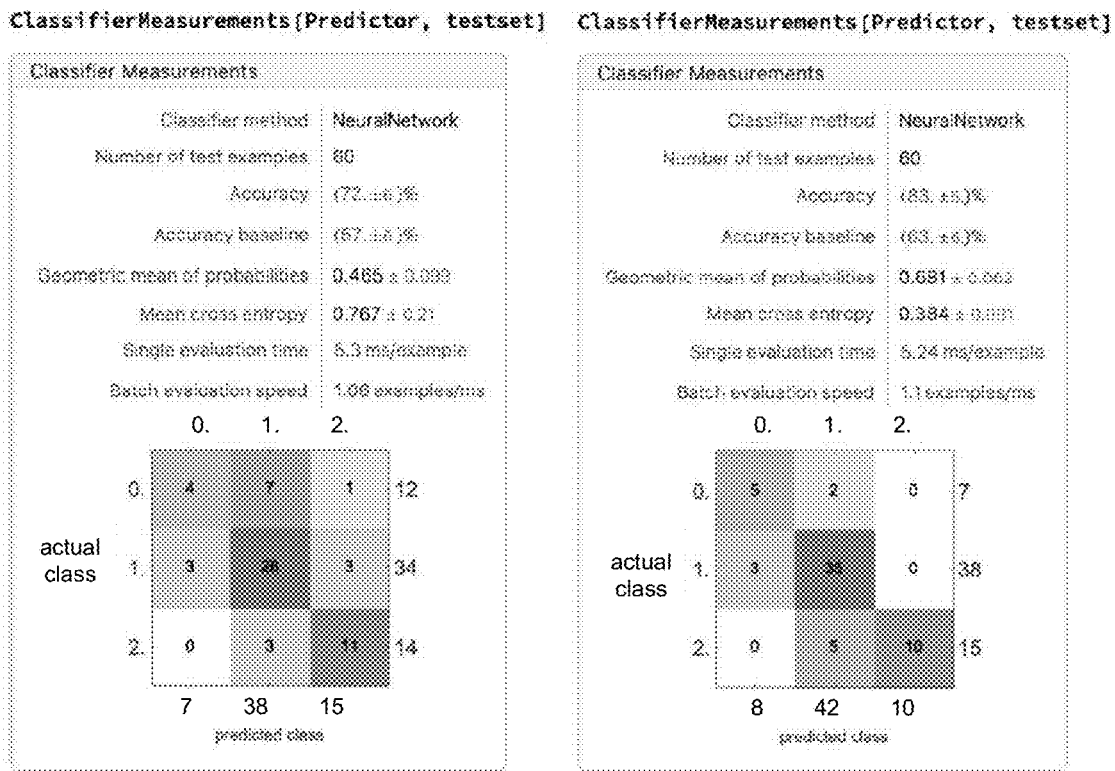

FIG. 26. illustrates three trials of models trained on all Six Data Points (for remaining two trials see FIG. 52B).

The result of dropping out of Racket Head Position yielded an average accuracy of 82.6%±5.89%. The accuracy improved by 1 percent and the standard deviation went down by nearly 3 percent. Over the few runs the randomized dataset is less stable than when trained using 6 parameters, with more fluctuations in the amount of each decision. The yes lets and strokes are still being classified with accuracy, and the no lets are being classified with relatively more accuracy consistently. The result confirmed the hypothesis that the model may perform better after dropping out some data. The rationale behind this scenario could possibly be that the Racket Head Position provides similar information as the attacking player position, just offset by the reach of the player. Thus, having similar information with noise may not help the model after all.

Dropping Out Racket Head Position and the First Bounce Position

Figure 27:
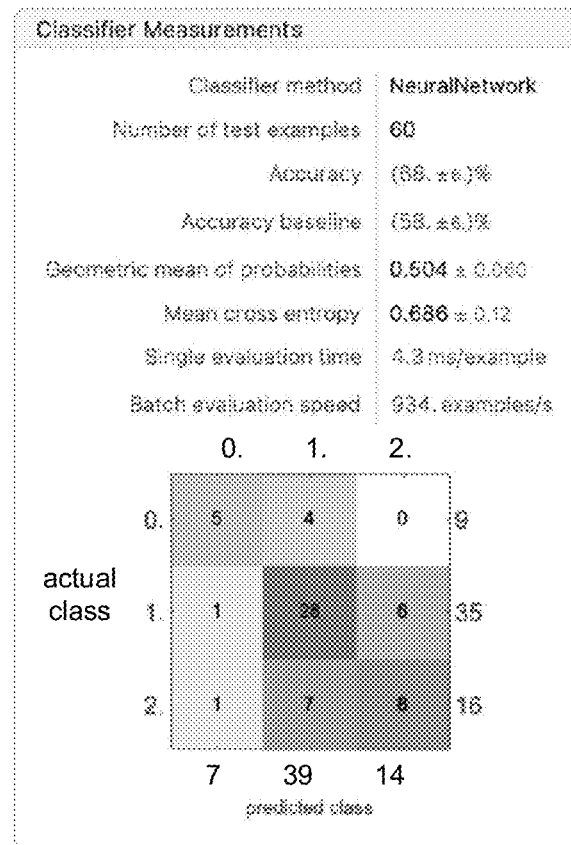
FIG. 27 illustrates a trial of model trained with Dropping out Racket Head Position and the First Bounce Position.

FIG. 27. illustrates a Trial of Model trained with Dropping out Racket Head Position and the First Bounce Position. (For remaining 4 Trials, See FIG. 52C)

Taking away the information of the First Bounce Position drastically decreased the model performance to an average accuracy of 71.6%±5.82%. The model became more inconsistent with every category compared to only dropping out Racket Head Position. The First Bounce Position was removed as we hypothesized that the Ball Position in Frame and the Second bounce can provide enough information about the ball's path, and the first bounce position, sometimes located in front of the Ball Position in Frame and sometimes located behind, will only provide a noise. This hypothesis is proved wrong and the First Bounce Position does play an important role in predicting decisions.

Dropping Out Racket Head Position and Second Bounce Position

Figure 28:
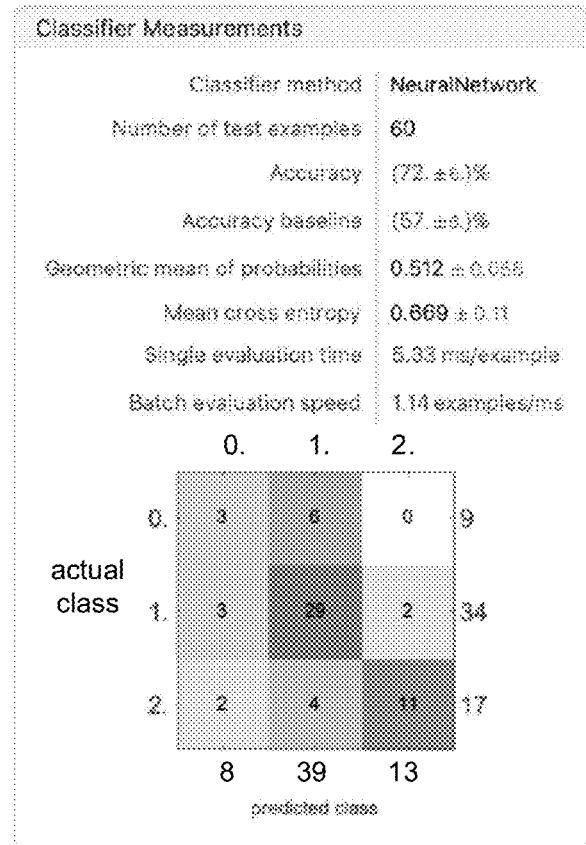
FIG. 28 illustrates a trial of model trained with Dropping out Racket Head Position and the Second Bounce Position.
Figure 52C:
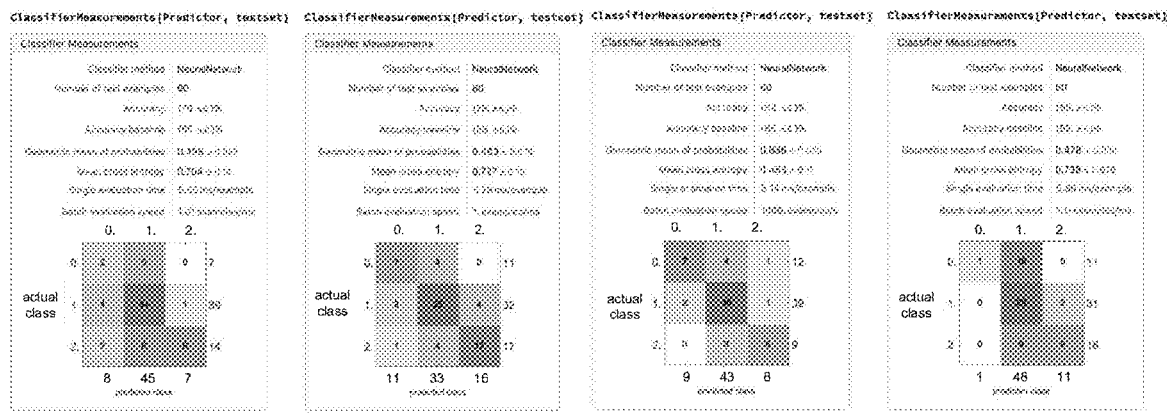
Figure 52D:
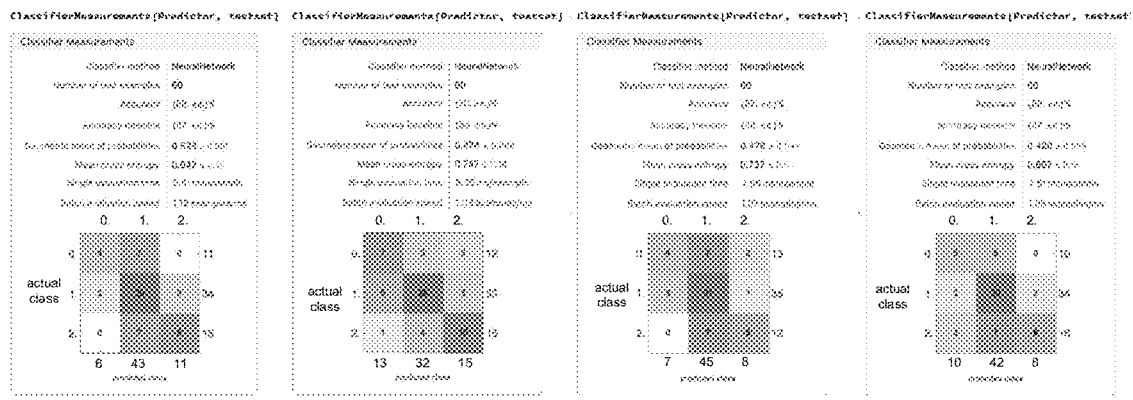

FIG. 28. illustrates a Trial of Model trained with Dropping out Racket Head Position and the Second Bounce Position (for remaining 4 Trials See FIG. 52D)

The models trained with these sets of data performed the worst of all, with average accuracy falling below 69%±1.79%. The rationale behind taking away the second bounce is that, in all interferences, the contact happened before the second bounce, and in many interferences the second bounce traveled away from the position of contact, which may cause it to be less valuable as an informational data point. However, this notion is proved wrong as the accuracy fell below 70% and became inconsistent in all categories.

Model Performance with Modified Data

The nine modified data points are as follows:

Distance of Attacking Player (AP) to Retreating Player (RP)

Distance of Attacking Player to Ball Position in Frame

Distance of Retreating Player to Ball Position in Frame

Distance of Attacking Player to Second Bounce

Distance of Racket Head to Retreating Player

Distance of the Ball Position in Frame to Second Bounce

Distance of Racket Head to Ball Position in Frame

The Shortest Distance From Racquet Head to The Path of Ball

Access to the Front Wall: How Much is Blocked by the Other Player

We proposed to train a model using this second-layer information to see if it will improve our model performance. Considering that, within those nine pieces of information, some may contain similar information with another, we will train several models with selected values and compare their performances.

All Nine Modified Data (MD)) Points

In this experiment we used all nine MDs to train the model. 340 data points are used in the training set and 60 are used in the testing set.

Figure 29:
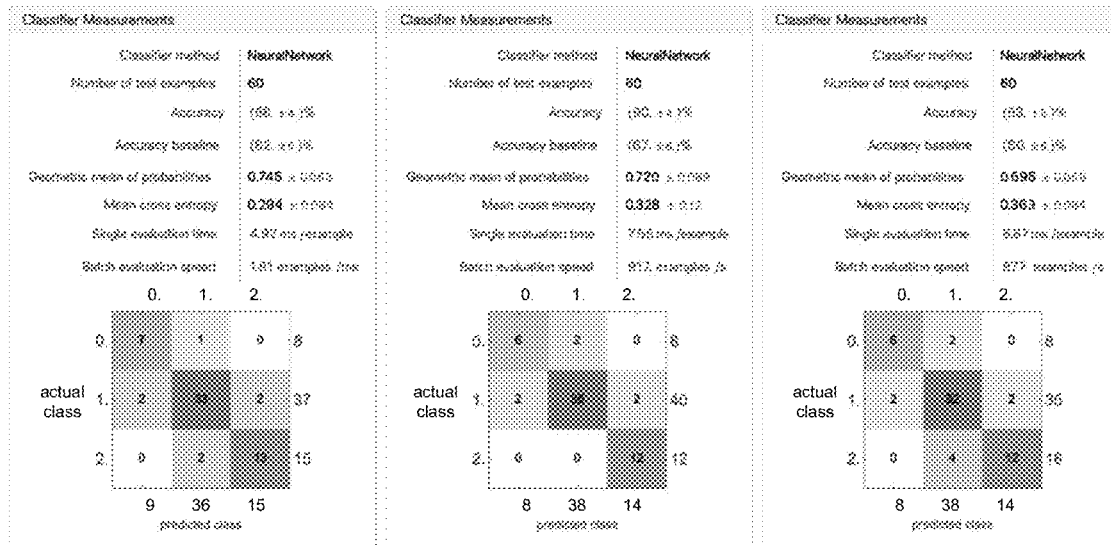
FIG. 29 illustrates three trials of models trained on all nine modified data points.
Figure 52E:
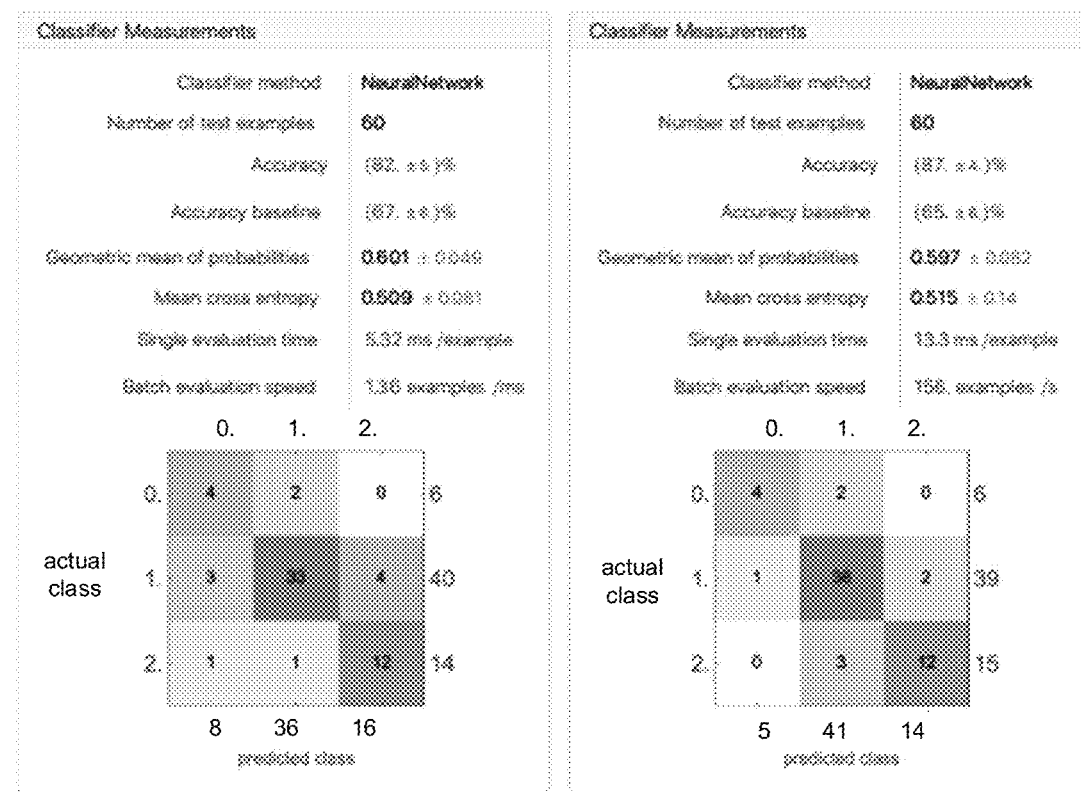

FIG. 29. illustrates three trials of models trained on all nine Modified Data Points (for remaining 2 trials see FIG. 52E)

The average accuracy reached 86%±3.03%. This performance was the best model achieved yet through Wolfram Mathematica. Compared to previous best model achieved by dropping out Racket Head Position, the average accuracy improved by 3.4% and standard deviation decreased by 2.86%

Including MD #1, #2, #3, #4, #6, #8, #9

Figure 30:
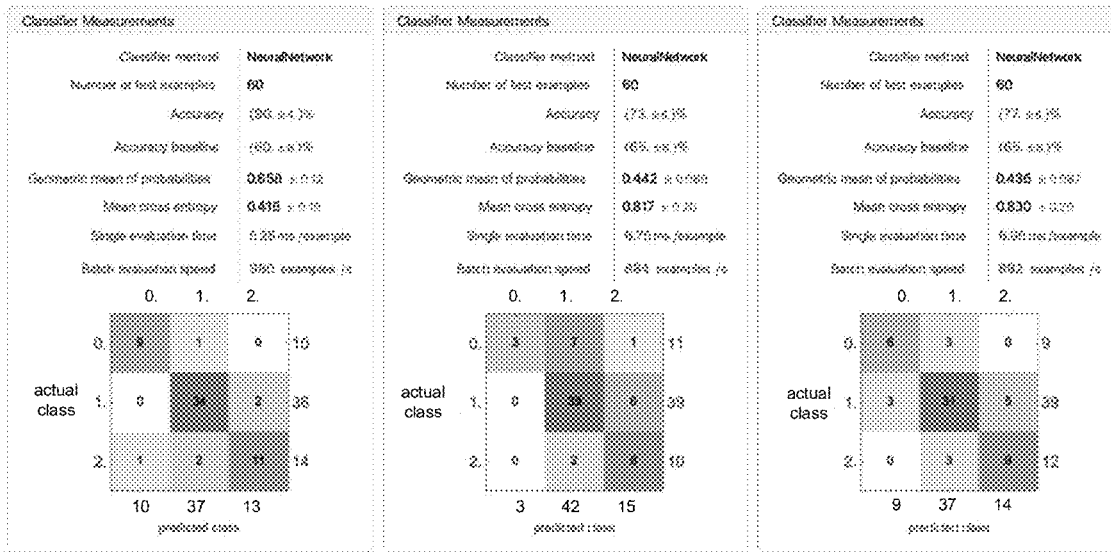
FIG. 30 illustrates three trials of models trained on seven modified data points.

In the second experiment, we excluded MD #5 and MD #7. Those two values are excluded as we believe they can be redundant to some of the other values. MD #5, "Distance of Racket Head to Retreating Player" provides similar information to MD #1, "Distance of Attacking Player to Retreating Player." MD #7, "Distance of Racket Head to Ball Position in Frame" provides similar information to MD #4, "Distance of Attacking Player to Second Bounce" FIG. 30 illustrates three trials of models trained on seven Modified Data Points (for remaining two trials see FIG. 52F)

The average accuracy dropped to 81.2%±6.625%. This indicates that this was a failed attempt of removing information. The standard deviation also drastically increased. Some trials reached an accuracy of 90% yet some dropped to 73%. Overall the result was inconsistent and the accuracy dropped.

Including MD #1, #2, #3, #4, #6

In our third experiment MD #8 and MD #9 are also removed. Those two values are two special cases, because in the process of calculating those values, complicated methods were used (see section 3.5.8 and 3.5.9). All other values were calculated simply by finding the distance between positions. In removing those two values we wanted to see how much these two values contributed to the model performance.

Figure 31:
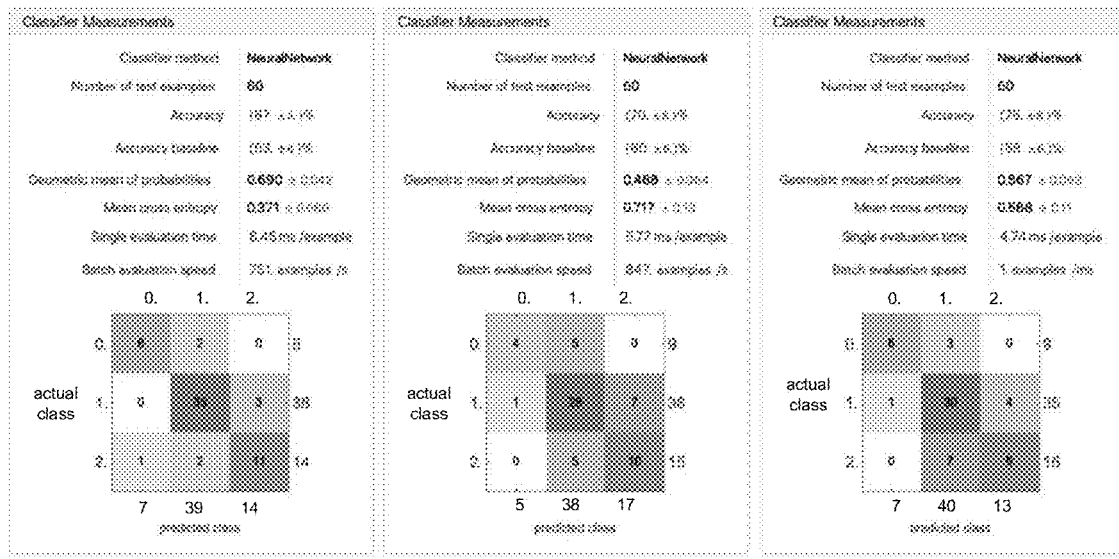
FIG. 31 illustrates three trials of models trained on five modified data points.
Figure 52F:
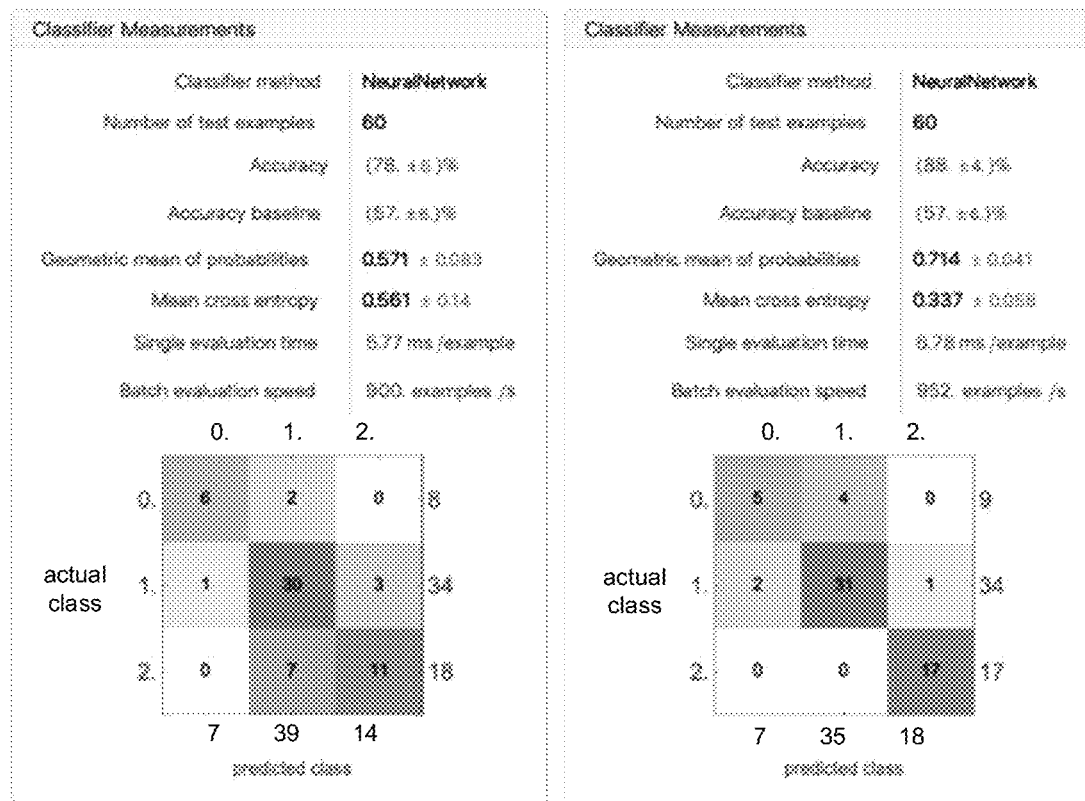
Figure 52G:
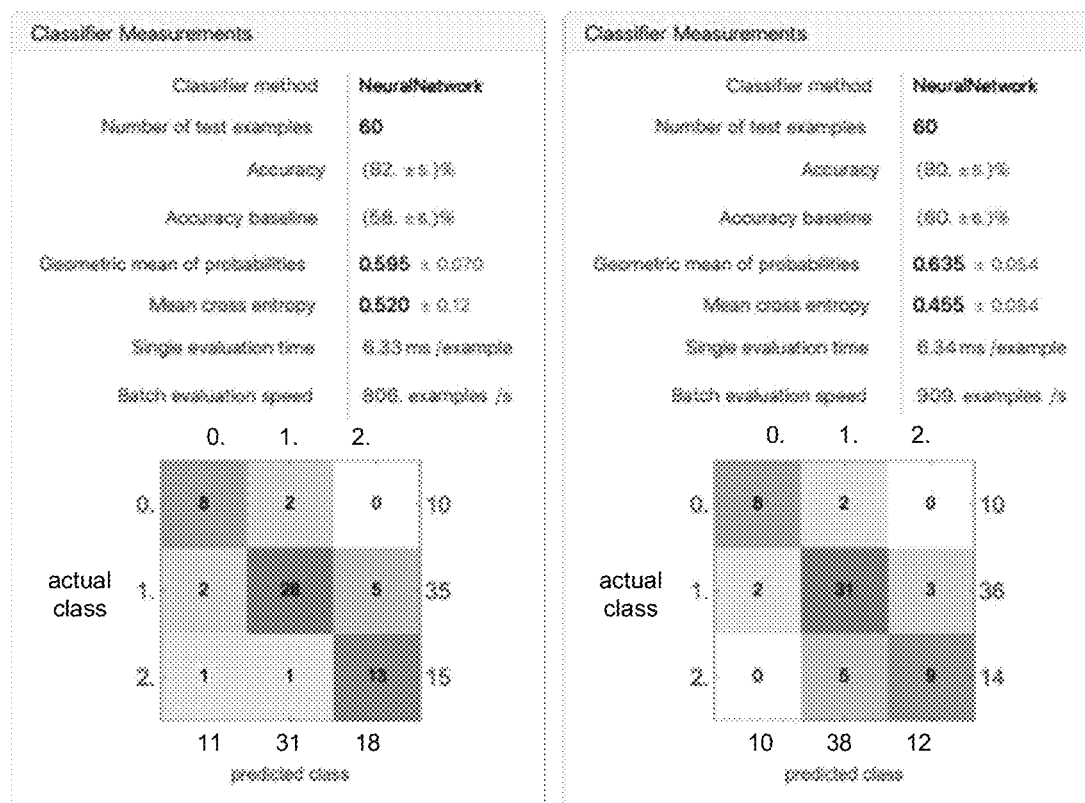

FIG. 31. illustrates three trials of models trained on five Modified Data Points (For remaining two trials see FIG. 52G)

The Model Performance reached an average accuracy of 78.8%±5.84%. This value is more than 7% lower than when all 9 MDs were used and 2.4% lower than when only MD #5 and #7 are removed. This indicates that those two values indeed contain useful information for the model's performance.

Model Performance with Modified Data Combined with Primitive Data

In this section showing the Wolfram Mathematica results, we explored the performance of our model when trained with two sets of data: the Modified Data (MD) and the Primitive Data (PD). The idea behind this is that although the distance-related data, which is the Modified Data, can provide a good insight of what the situation is, the model could not understand the location of where on the court this happened. Therefore, through combining the Position-related data and the Distance-related data, we can build a model that considers the situation in a more well-rounded way, which hopefully can increase the model performance.

There are, in total, 21 data points in consideration (12 Primitive and 9 Modified). In this section, combinations of each are going to be tested. All PDs and MDs are listed here.

PD
- 1 & 2: Attacking Player Position X and Y value 3 & 4: Retreating Player Position
- 5 & 6: Ball Position in the frame 7 & 8: First Bounce
- 9 & 10: Second Bounce
- 11 & 12: Racket Head Position MD
- Distance of Attacking Player (AP) to Retreating Player (RP)
- Distance of Attacking Player to Ball Position in Frame
- Distance of Retreating Player to Ball Position in Frame
- Distance of Attacking Player to Second Bounce
- Distance of Racket Head to Retreating Player
- Distance of the Ball Position in Frame to Second Bounce
- Distance of Racket Head to Ball Position in Frame
- The Shortest Distance From Racquet Head to The Path of Ball
- Access to the Front Wall: How Much is Blocked by the Other Player Training with all 21 Data Points In the first experiment we are going to utilize all data points we have. All 21 data points are fed into the model and we investigated the model performance.

Figure 32:
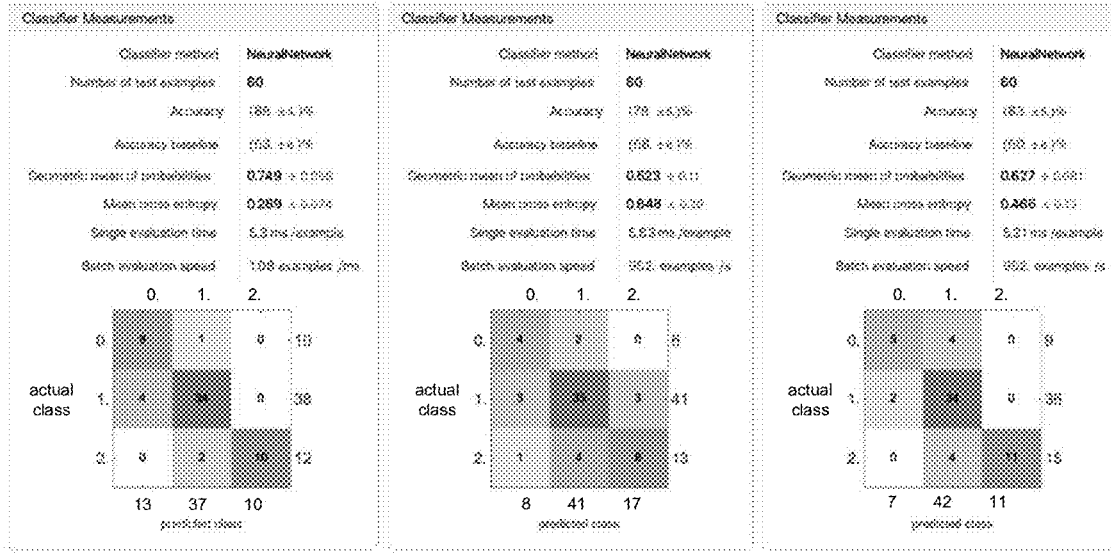
FIG. 32 illustrates three trials of models trained on all 21 data points.
Figure 52H:
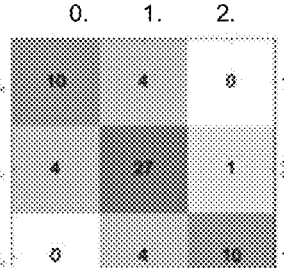

FIG. 32. illustrates three trials of models trained on all 21 Data Points (for remaining 2 trials see FIG. 52H)

The model's accuracy dropped to 81.8%±3.71%. Surprisingly the model performance did not improve after combining the PD and MD data. One possible explanation for this is that too many data points are provided for a small dataset. The model is incapable of learning all the correlations using the resources it has.

Training with PD 1-10 and all MD

As shown in previous experiments, including PD 11 and 12 (Racket Head Position) acted as a noise to the model. In this experiment we excluded those two values and evaluated the model performance.

Figure 33:
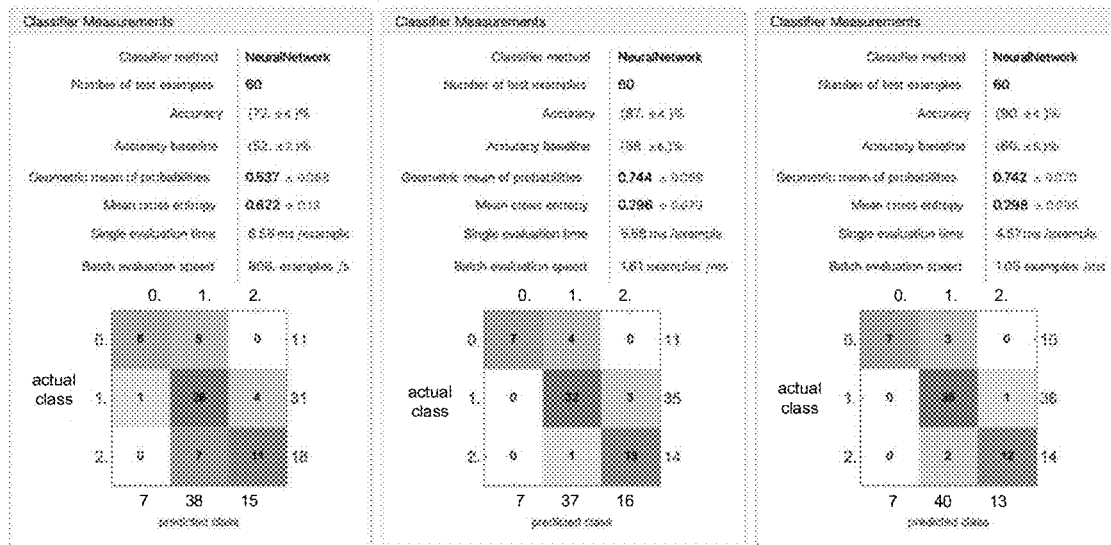
FIG. 33 illustrates three trials of models trained on PD 1-10 and all MD.
Figure 52I:
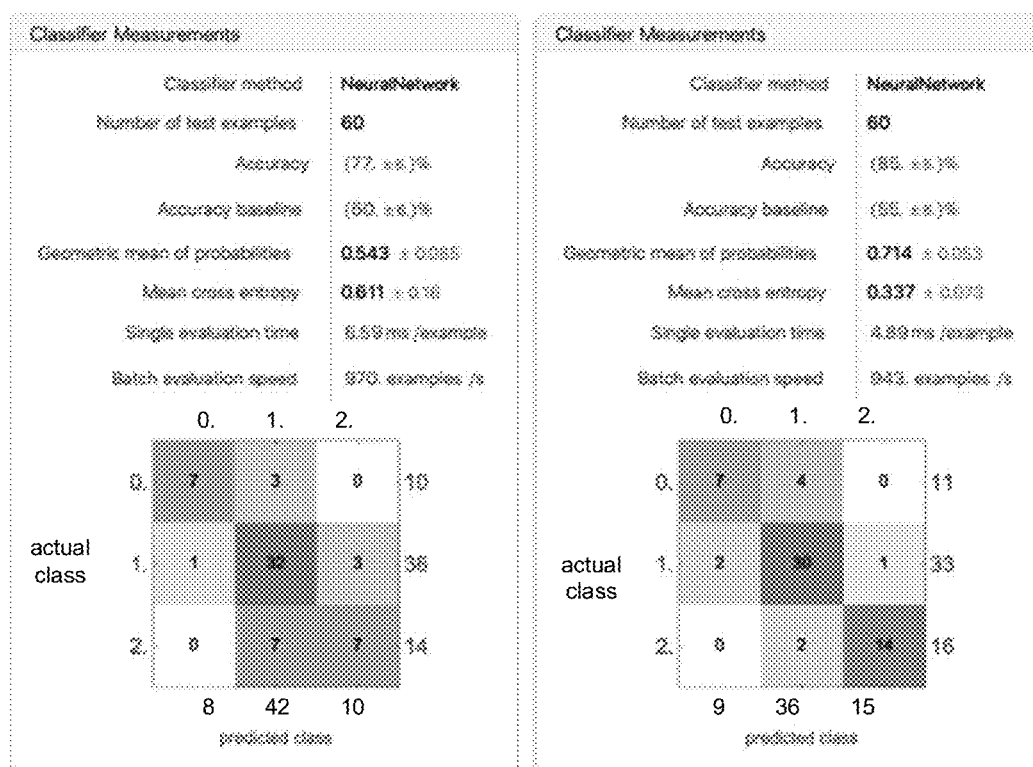

FIG. 33 illustrates three trials of models trained on PD 1-10 and all MD (For remaining two trials see FIG. 52I)

The average accuracy is 82.2%±6.68%. No significant improvements are made after those values are removed.

Training with PD 1-10 and MD #3, 5, 6, 8, and 9

In this experiment, we selected from MD values and evaluated model performance.

Figure 34:
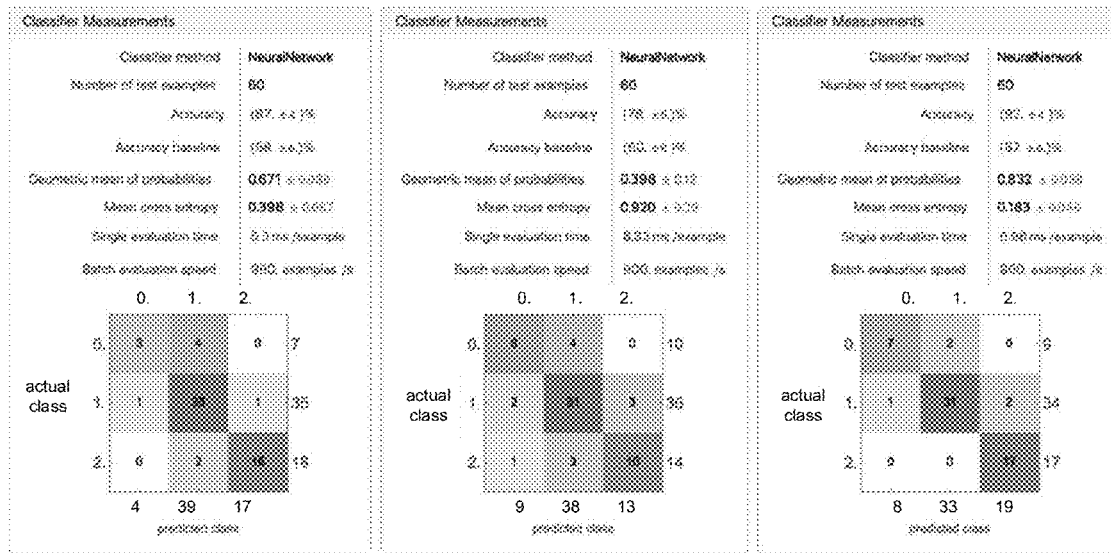
FIG. 34 illustrates three trials of models trained on PD 1-10 and five MD.
Figure 52J:
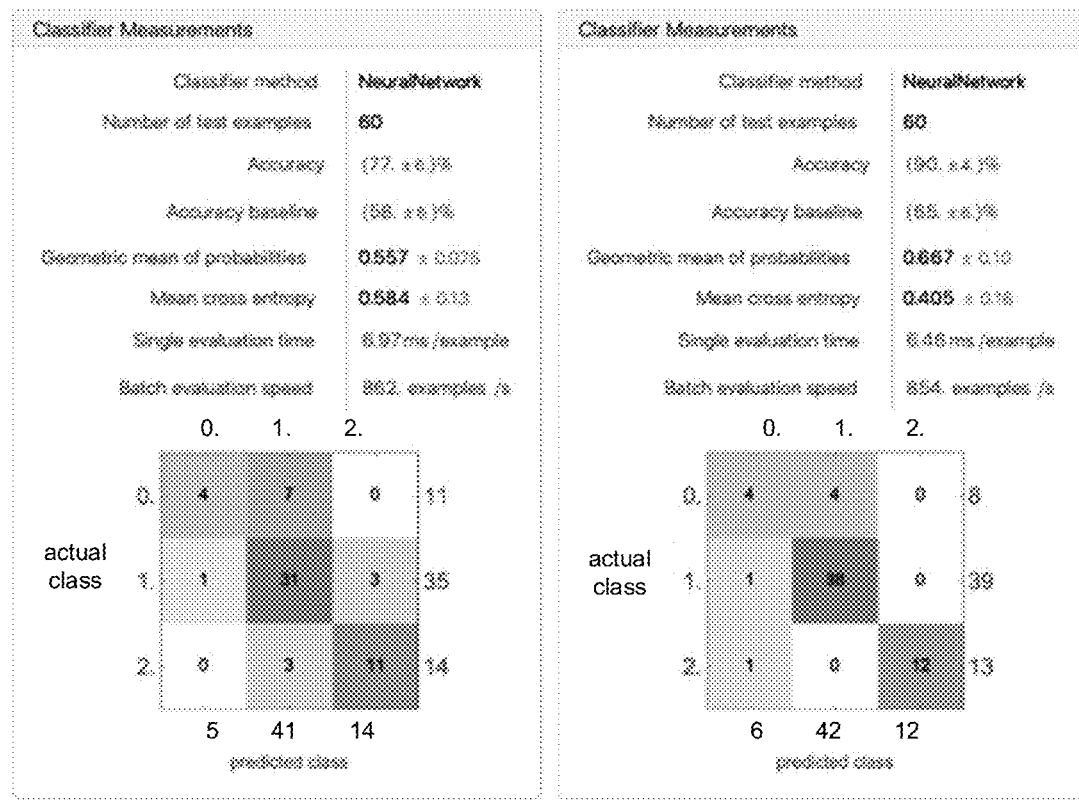

FIG. 34. illustrates three trials of models trained on PD 1-10 and five MD (For remaining two trials see FIG. 52J)

The average accuracy reaches 84.8%±6.17%. No significant improvements are made after some values are removed.

Results with Python

Experimental Design

Slightly different to the method used with Wolfram Mathematica, the 400 decisions are split into three sections: 280 (70%) in the training set, 40 (10%) in the validation set, and 80 (20%) in the testing set. The Neural network consists of two layers with 64 nodes and 128 nodes and one output layer.

Model Performance on Primitive Data
Training on all Six Data Points

TABLE 1

Five Trials of Model Trained on All Six Data Points

| | Trial 1 | Trial 2 | Trial 3 | Trial 4 | Trial 5 |
|---|---|---|---|---|---|
| Accuracy on the Test Set | 0.762 | 0.750 | 0.775 | 0.712 | 0.737 |
| Loss | 0.714 | 0.729 | 0.656 | 0.725 | 0.761 |

The models trained with all six data points performed significantly worse than its Wolfram Mathematica counterpart, achieving an average accuracy of 0.747±0.022 and an average loss of 0.717±0.034. With Wolfram Mathematica's built-in Neural Network training method unavailable, it is hard to replicate the result achieved by Wolfram Mathematica.

Dropping Out Data

Although it is hard to replicate the result achieved by Wolfram Mathematica, the same drop-out method can be tested on the Neural Network. The core data point of Attacking Player Position, Retreating Player Position, and Ball Position in Frame is going to be kept, and the remaining three are going to be dropped to test if this method will increase the performance of the model.

TABLE 2

Five Trials of Model Trained by Dropping out Racket Head Position

|  | Trial 1 | Trial 2 | Trial 3 | Trial 4 | Trial 5 |
|---|---|---|---|---|---|
| Accuracy on the Test Set | 0.825 | 0.712 | 0.813 | 0.700 | 0.800 |
| Loss | 0.747 | 0.571 | 0.461 | 1.03 | 0.491 |

Average Accuracy: 0.77 ± 0.053; Average Loss: 0.66 ± 0.21

TABLE 3

Five Trials of Model Trained by Dropping Out Racket Head Position and Second Bounce Position

|  | Trial 1 | Trial 2 | Trial 3 | Trial 4 | Trial 5 |
|---|---|---|---|---|---|
| Accuracy on the Test Set | 0.800 | 0.75 | 0.738 | 0.788 | 0.738 |
| Loss | 0.930 | 0.643 | 0.624 | 0.552 | 0.662 |

Average Accuracy: 0.763 ± 0.026; Average Loss: 0.682 ± 0.129

TABLE 4

Five Trials of Model Trained by Dropping Out Racket Head Position and First Bounce Position

|  | Trial 1 | Trial 2 | Trial 3 | Trial 4 | Trial 5 |
|---|---|---|---|---|---|
| Accuracy on the Test Set | 0.788 | 0.800 | 0.800 | 0.775 | 0.75 |
| Loss | 0.714 | 0.525 | 0.526 | 0.934 | 0.634 |

Average Accuracy: 0.783 ± 0.016; Average Loss: 0.667 ± 0.151

TABLE 5

Five Trials of Model Trained by Dropping Out Racket Head Position, First Bounce Position, and Second Bounce Position

|  | Trial 1 | Trial 2 | Trial 3 | Trial 4 | Trial 5 |
|---|---|---|---|---|---|
| Accuracy on the Test Set | 0.738 | 0.675 | 0.775 | 0.712 | 0.738 |
| Loss | 0.568 | 0.752 | 0.617 | 0.752 | 0.943 |

Average Accuracy: 0.728 ± 0.033; Average Loss: 0.726 ± 0.131

The Model which achieved the best accuracy is the model trained on the dataset which dropped out the Racket Head Position and First Bounce Position, with an average accuracy of 78.3%±1.6%, around 4% less accurate than the best model trained in Wolfram Alpha.

Model Performance and Normalization

Taking the best model (trained on dropping out the Racket Head Position and First Bounce Position), we investigated the effect of Normalization on this task. The above results were all performed by models trained with data normalized by Tensorflow's built-in normalization function. We trained models five more times without the Normalization to see the result.

TABLE 6

Five Trials of Model Trained Without Normalization

|  | Trial 1 | Trial 2 | Trial 3 | Trial 4 | Trial 5 |
|---|---|---|---|---|---|
| Accuracy on the Test Set | 0.625 | 0.712 | 0.712 | 0.825 | 0.712 |
| Loss | 0.849 | 0.679 | 0.733 | 0.59 | 0.714 |

Average Accuracy: 0.717 ± 0.064; Average Loss: 0.713 ± 0.084

The average Accuracy dropped by around 7% with a similar average loss. This result demonstrated that the normalization method has helped the model during the classification process.

Model Performance with Modified Data

The nine modified data points are as follows:
Distance of Attacking Player (AP) to Retreating Player (RP)
Distance of Attacking Player to Ball Position in Frame
Distance of Retreating Player to Ball Position in Frame
Distance of Attacking Player to Second Bounce
Distance of Racket Head to Retreating Player
Distance of the Ball Position in Frame to Second Bounce
Distance of Racket Head to Ball Position in Frame
The Shortest Distance From Racquet Head to The Path of Ball
Access to the Front Wall: How Much is Blocked by the Other Player We proposed to train a model using this second-layer information to see if it will improve our model performance. Considering that within those nine pieces of information some may contain similar information with another, we will train several models with selected values and compare their performances.

All Nine Modified Data (MD) Points

In the first experiment of this section we decided to use all nine values to train the model. The experimental parameters are kept the same with 280 data in the training set, 40 in the validation set, 80 in the testing set, and the neural network still consists of two layers with 64 nodes, 128 nodes and one output layer.

TABLE 7

Five Trials of Model Trained with All Nine Modified Data

|  | Trial 1 | Trial 2 | Trial 3 | Trial 4 | Trial 5 |
|---|---|---|---|---|---|
| Accuracy on the Test Set | 0.825 | 0.837 | 0.762 | 0.774 | 0.825 |
| Loss | 0.685 | 0.374 | 0.430 | 0.615 | 0.603 |

Average Accuracy: 0.805 ± 0.030, Average Loss 0.541 ± 0.119

Our model reached an accuracy of 80.5%±3.0%. This result exceeded the previous best model achieved in Python by around 1.7% on average. The average loss drastically improved by more than 15%. This indicates that the modified data approach may indeed be useful to the model training process.

Including MD #1, #2, #3, #4, #6, #8, #9

In the second experiment, we excluded MD #5 and MD #7. Those two values are excluded as we believe they can be redundant to some of the other values. MD #5, "Distance of Racket Head to Retreating Player" provides similar information to MD #1, "Distance of Attacking Player to Retreating Player." MD #7, "Distance of Racket Head to Ball Position in Frame" provides similar information to MD #4, "Distance of Attacking Player to Second Bounce"

TABLE 8

Five Trials of Model Trained with Seven Modified Data

|  | Trial 1 | Trial 2 | Trial 3 | Trial 4 | Trial 5 |
|---|---|---|---|---|---|
| Accuracy on the Test Set | 0.813 | 0.800 | 0.775 | 0.813 | 0.850 |
| Loss | 0.557 | 0.538 | 0.421 | 0.535 | 0.985 |

Average Accuracy: 0.810 ± 0.024, Average Loss 0.607 ± 0.195

The average accuracy increased by 0.5%, indicating that this was a successful attempt of removing information. The average loss stayed around the same value, increasing by 6%.

Including MD #1, #2, #3, #4, #6

In our third experiment MD #8 and MD #9 are removed. Those two values are two special cases, because in the process of calculating those values, complicated methods were used (see section 3.5.8 and 3.5.9). All other values were calculated simply by finding the distance between positions. In removing those two values we wanted to see how much these two values contributed to the model performance.

TABLE 9

Five Trials of Model Trained with Five Modified Data

|  | Trial 1 | Trial 2 | Trial 3 | Trial 4 | Trial 5 |
|---|---|---|---|---|---|
| Accuracy on the Test Set | 0.775 | 0.75 | 0.887 | 0.762 | 0.850 |
| Loss | 0.573 | 0.530 | 0.353 | 0.528 | 0.545 |

Average Accuracy: 0.805 ± 0.054, Average Loss 0.505 ± 0.078

Surprisingly, the model accuracy did not drop compared to using all nine data points. The model also has a lower and comparatively more stable standard deviation. This might indicate that MD #8 and #9 does not provide extremely useful information.

Model Performance with Modified Data Combined with Primitive Data

In this 4.2 section showing the Python results, we explored the performance of our model when trained with two sets of data: the Modified Data (MD) and the Primitive Data (PD). The idea behind this is that although the distance-related data, which is the Modified Data, can provide a good insight of what the situation is, the model could not understand the location of where on the court this happened. Therefore, through combining the Position-related data and the Distance-related data, we can build a model that considers the situation in a more well-rounded way, which hopefully can increase the model performance.

There are, in total, 21 data points in consideration (12 Primitive and 9 Modified). In this section, combinations of each are going to be tested. All PDs and MDs are listed here.

PD
  1 & 2: Attacking Player Position X and Y value 3 & 4: Retreating Player Position
  5 & 6: Ball Position in the frame 7 & 8: First Bounce
  9 & 10: Second Bounce
  11 & 12: Racket Head Position MD
  Distance of Attacking Player (AP) to Retreating Player (RP)
  Distance of Attacking Player to Ball Position in Frame
  Distance of Retreating Player to Ball Position in Frame
  Distance of Attacking Player to Second Bounce
  Distance of Racket Head to Retreating Player
  Distance of the Ball Position in Frame to Second Bounce
  Distance of Racket Head to Ball Position in Frame
  The Shortest Distance From Racquet Head to The Path of Ball
  Access to the Front Wall: How Much is Blocked by the Other Player Training with all 21 Data Points In the first experiment we are going to utilize all data points we have. All 21 data points are fed into the model and we investigated the model performance.

TABLE 10

Five Trials of Model Trained with All 21 Data Points

|  | Trial 1 | Trial 2 | Trial 3 | Trial 4 | Trial 5 |
|---|---|---|---|---|---|
| Accuracy on the Test Set | 0.850 | 0.813 | 0.837 | 0.850 | 0.837 |
| Loss | 0.562 | 1.32 | 0.561 | 0.425 | 0.547 |

Average Accuracy: 0.837 ± 0.014, Average Loss: 0.683 ± 0.323

The model achieved the highest accuracy yet in the Python section, exceeding the previous best Python model by 2.7%. This proves the idea that positional data, adding to the distance-related data, can improve the model's understanding of interferences and thereby improve its performance.

Training with PD 1-10 and all MD

As shown in previous experiments, including PD 11 and 12 (Racket Head Position) acted as a noise to the model. In this experiment we excluded those two values and evaluated the model performance.

TABLE 11

Five Trials of Model Trained with PD #1-#10 and All MD

|  | Trial 1 | Trial 2 | Trial 3 | Trial 4 | Trial 5 |
|---|---|---|---|---|---|
| Accuracy on the Test Set | 0.875 | 0.762 | 0.875 | 0.837 | 0.912 |
| Loss | 1.39 | 0.764 | 0.319 | 0.399 | 0.252 |

Average Accuracy: 0.852 ± 0.051, Average Loss: 0.625 ± 0.421

In this experiment, the average accuracy once more experienced a considerable improvement of around 1.5% over the model trained in the last experiment. It is currently the model with the best accuracy in the Python section. Worth noting, trial 5 provided the current best singular trial model in Python with 91.2% accuracy.

Training with PD 1-10 and MD #3, 5, 6, 8, and 9

In this experiment, we selected from MD values and evaluated model performance.

TABLE 12

Five Trials of Model Trained with PD #1-#10 and Five MD

|  | Trial 1 | Trial 2 | Trial 3 | Trial 4 | Trial 5 |
|---|---|---|---|---|---|
| Accuracy on the Test Set | 0.875 | 0.813 | 0.837 | 0.850 | 0.875 |
| Loss | 0.466 | 0.760 | 0.472 | 0.424 | 0.364 |

Average Accuracy: 0.850 ± 0.024, Average Loss: 0.497 ± 0.137

Compared to the last model, this model achieved 85% accuracy (within 0.2% of last model) with far better loss. The Loss is 12% lower than the previous model with far steadier standard deviation.

Discussion

Analysis of Result

In this section, we analyzed the results we found in the disclosure. We compared the best results from both Python and Mathematica.

Overall Result

Overall, the best model by Wolfram Mathematica performed an average accuracy of 86%±3.03%; the best model by Python performed an average accuracy of 0.852±0.051 (which is 85.2%±5.1%).

An average accuracy of 85% is already reaching the level of satisfaction in a real-life setting. For instance, in a regular professional match, the number of calls can vary between 20 to 30. If 85% of the decisions are made correctly, only 3 to 5 decisions are going to be incorrectly made. Given that in many cases, an interference can be called either way (no let or yes let, yes let or stroke), referees nowadays already make almost 3 controversial calls in a regular match.

On the other hand, although the best models from Wolfram Mathematica and Python have similar average accuracies, the two of them were trained using drastically different data. In Wolfram Mathematica, the best model was achieved using only the 9 Modified Data Points. In Python, the best model was achieved using both the 9 Modified Data (MD) Points and the Primitive Data (PD) Points #1-#10. This result indicates that models trained on different platforms vary in performance using the same data. Wolfram Mathematica's models dropped in accuracy when both PDs and MDs were used, but Python's models peaked using these sets of data.

After all, we do not have enough knowledge as to how Wolfram Mathematica's neural networks are structured. This blind spot prevents us from being able to analyze why the two platforms vary in performances using the same sets of data.

Usefulness of Different Data Points

To some extent, this disclosure is an investigation into how different combinations of data points contribute to the model performance. Different combinations cause the models to perform differently, and their effects vary between the Wolfram Mathematica section and the Python Section.

The six Primary Data Points (PD) already provide enough information for the model to perform at an acceptable level. Using only the six PDs, the Wolfram Mathematica models reached an average accuracy of 81.4%±8.36%. The Python models reached a lower average accuracy of 74.7%±2.2% (0.747±0.022).

The initial drop-out method drops out different data points and evaluates the impact of those data points being removed. For Wolfram Mathematica, the accuracy increased to 82.6%±5.89% after the Racket Head Position was removed. The accuracy drastically dropped after any other values were removed. For Python, the accuracy increased the most when both the Racket Head Position and the First Bounce Position were removed, reaching 78%±1.6% (0.783±0.016). The increase in performance after removal of data indicates that for the initial six data points, some contain information that could act as noise and actually stop the model from getting improvement.

Then, the nine Modified Data Points (MD) were introduced to the dataset. We conducted one round of experiments using only the nine MDs and evaluated the Models. Wolfram Mathematica's models provided the best performance at this stage, reaching an average accuracy of 86%±3.03%. The Python models also experienced an increase in performance, reaching an average accuracy of 80.5%±3.0% (0.805±0.030). This shows that the nine MDs do in fact provide very useful information, and we were right in calculating those Modified Data Points. As some MDs are slightly redundant, we experimented with data drop-out on the nine MDs. In the first round MD #5 and #7 are removed. This dropped the Wolfram Mathematica models' average accuracy to 81.2%±6.625%, but increased the Python model's average accuracy to 81.0%±2.4% (0.810±0.024). In the second round MD #8 and #9 are removed to evaluate their usefulness to our model, and for both platforms the accuracy decreased, indicating that those two values are helpful to the model's performance.

We then combined the MDs and the PDs to do a final round of evaluation. In this section, only the Python models have gained accuracy and better performance. When all MDs and PDs were used, the Python models achieved an average accuracy of 83.7%±1.4% (0.837±0.014). When all MDs and PD #1-#10 were used, the Python models achieved its best performance of an average accuracy of 85.2%±5.1% (0.852±0.051). Another combination of data using MD #3, #5, #6, #8, #9 and PD #1-#10 reached an average accuracy of 85.0%±2.4% (0.850±0.024), with 15% less loss and far steadier standard deviation compared to the best-performing model.

Case-by-Case Analysis of Some Wrong Calls

In this section, we performed a case-by-case analysis of incorrectly-made decisions.

We take two of each kind of incorrect decision, and provide reasons to why this might be wrongly called in the model's perspective and in the real-life perspective. We hope that in doing this, some insights could possibly be found regarding why the model made the wrong calls.

The incorrect decisions are made by the best-performing models in Python. We chose models trained in python for this section because the prediction results were easier to fetch and the Python best-performing model was trained using PD 1-10 and all MD, thus almost all data points were considered.

Yes Lets Classified Incorrectly

Figure 35:
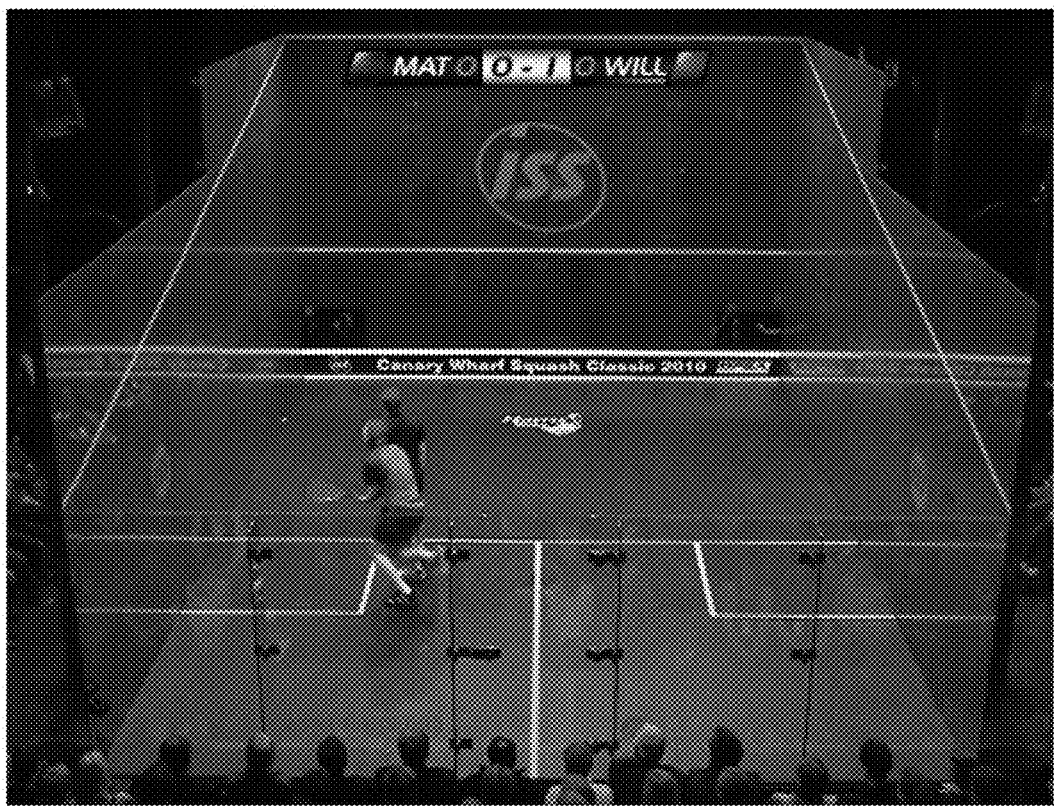
FIG. 35 illustrates a video frame corresponding to Data #144 in the dataset of the present disclosure.

FIG. 35 illustrates Data #144, Matthew/Willstrop 2010 Canary Wharf 8:39 Yes Let (SQUASHTV, 2013) Possibility Given by Model: [No Let—94%, Yes Let—6%, Stroke-0%]

In this situation, the retreating player played a ball that died very quickly. The attacking player was provided a line to the ball. The referee deemed this situation a Yes Let as interference happened and he thought that the attacking player could get the ball. In our perspective (as a non-professional normal viewer biased by our experiences), this could also be identified as a No Let as the ball's quality is high and the AP may not be able to get the ball even without the interference.

The Model deemed this more likely a No Let possibly because the ball stayed up short. Worth noting, the possibility it provided is overwhelmingly in favor of the No Let decision, which should not be correct. The possibility for No Let should not reach more than ninety-percent, as this would be a close-called case.

Figure 36:
FIG. 36 illustrates a video frame corresponding to Data #347 in the dataset of the present disclosure.

FIG. 36 illustrates Data #347, Matthew/Gaultier 2018 ToC 1:32:33 Yes Let (SQUASHTV, 2018) Possibility Given by Model: [No Let—0%, Yes Let—43%, Stroke-57%]

This case, in fact, is a controversial case in itself. The retreating player played a ball that landed very close to him yet the referee thinks there is enough distance away from it to be considered a Yes Let. In the video, the commentators pointed out that this case could well be a Stroke: "Well, I mean eh, it's not the best of shots here from Matthew (the RP). This is going to be interesting, Massarella (the referee) is gotta be consistent . . . If you watch where the ball bounces, the second bounce is by the service line . . . Well, I can assure you that Gregory Gaultier (the AP) will not be taking John Massarella out for any type of food or beverage . . . I think that was a stroke."

Similar to the commentators, we think that this should be decided as a Stroke, because the ball bounced right back to the RP and the RP wasn't able to clear. Our model agreed with us by giving 57% of the possibility to Stroke. This actually provides a good example to how human referees can make controversial decisions disagreed by the commentators and the audiences.

No Lets Classified Incorrectly

Figure 37:
FIG. 37 illustrates a video frame corresponding to Data #46 in the dataset of the present disclosure.

FIG. 37 illustrates Data #46, Matthew/Elshorbagy 2014 British Open 1:03:19 No Let (SQUASHTV, 2014) Possibility Given by Model: [No Let—6%, Yes Let—93%, Stroke-0%]

This is not a very controversial decision. The retreating player's shot went backwards and was very tight to the side wall. Although the AP could have possibly retrieved the shot had the RP not been there, the AP first went the wrong way (forwards) being deceived by the shot. The AP also showed very less effort to go through the interference and play the ball. The AP took the "wrong path" to the ball, combined with the quality of the shot from RP and the AP's lack of effort, is why the referee deemed this a No Let.

Since our model has not learned the idea of "wrong path" and "effort," it makes sense that our model is unable to understand this situation. From the same position shown in the picture, if the AP took the "right path," which is the path left and backwards around the RP, this could well be decided as a Yes Let.

Figure 38:
FIG. 38 illustrates a video frame corresponding to Data #333 in the dataset of the present disclosure.

FIG. 38 illustrates Data #333, Matthew/Gaultier 2018 ToC 36:22 No Let (SQUASHTV, 2018) Possibility Given by Model: [No Let—32%, Yes Let—68%, Stroke-0%]

This case is a situation between a Yes Let and a No Let. The referee deemed the AP unable to reach the shot as the shot quality is "too good."

In our opinion (as a non-professional normal viewer biased by our experiences), this could be decided either way. Personally, we think that the AP might be able to reach the ball had the RP provided a path, therefore this could be decided as a Yes-Let. The commentators and the referee think the opposite, because the ball's quality was very good.

Our model, in fact, reflects our thinking by providing a 32% possibility to No Let. This means that to the model, this could possibly be determined a No Let as well, although the model thinks that this situation is more towards a Yes Let.

After all, our model is trained with only 59 cases of No Let. This limits the amount of knowledge our model is able to learn and makes sense that our model is still unable to perform the most accurate refereeing.

Strokes Classified Incorrectly

Figure 39:
FIG. 39 illustrates another video frame corresponding to Data #46 in the dataset of the present disclosure.

FIG. 39 illustrates Data #46, Matthew/Elshorbagy 2014 British Open 58:10 Stroke (SQUASHTV, 2014). Possibility Given by Model: [No Let—0%, Yes Let—53%, Stroke—47%] This is a really, really interesting case. In this case, the AP is actually "fishing" for a Stroke. This means that the AP is manipulating his body position and exaggerating his swing to make the situation look more like a Stroke than a Yes Let. In this case, the AP stood his ground and waited for the ball instead of looking to play it normally. If the AP was going to play it normally, he would step into the ball and strike. Since he decided to fish for a Stroke, he shapes up and waits until the ball comes to him, as if he was going to hit the ball from where he is. This pushed the striking spot way back, which brought the RP into the range of the AP's swing. This, combined with the AP's exaggerated swing, makes the situation look more like a stroke. In reality, when the ball reaches him, it is already second-bounced, so he couldn't have hit it from where he is.

The commentators commented on the AP's actions: "He (the AP) is looking for Shorbagy (the RP) there . . . Well, he's got it (the Stroke), he is playing the rules . . . He (the AP) doesn't usually do that, he doesn't usually exaggerate. He is doing that (exaggerating his swing)."

For this case, the referee gave a Stroke although the AP is slightly fishing. In our understanding, the AP's fishing actions changed the situation from a fifty-percent Stroke to a seventy-percent Stroke.

Our Model deemed this almost a fifty-fifty situation. Of course, there is no knowledge that informs the model that the AP is fishing for a Stroke. It makes sense that our model is deciding this slightly towards a Yes Let situation.

Figure 40:
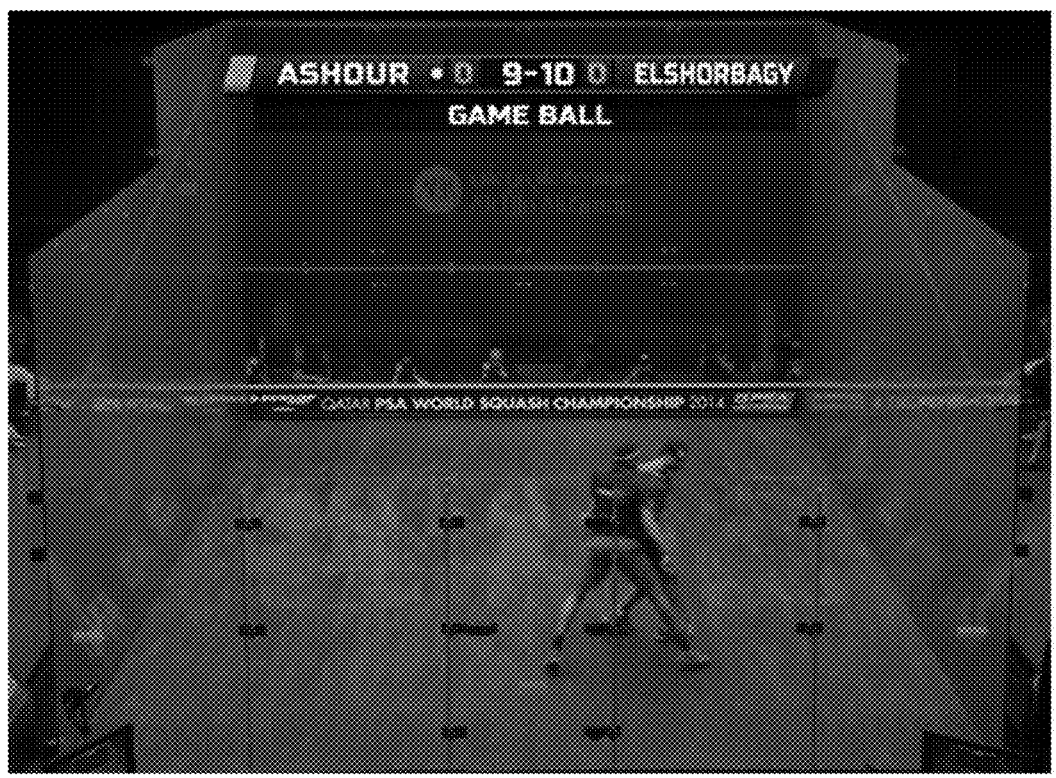
FIG. 40 illustrates a video frame corresponding to Data #244 in the dataset of the present disclosure.

FIG. 40 illustrates Data #244, Ashour/Elshorbagy 2014 World Championship 12:08 stroke (SQUASHTV, 2014) Possibility Given by Model: [No Let—0%, Yes Let—51%, Stroke-49%]

This is actually a pretty clear Stroke. The AP's swing was prevented by the RP and the ball was going right into the AP's range of swing.

The Model made the wrong decision possibly because the ball was at the front of the court when the interference happened, but it didn't know that the ball was traveling really fast and it entered AP's range when the interference was still happening.

The Model provided a 51%-49% chance in favor of a Yes Let. This is two close possibilities and with slight change of one data point, this could possibly be overturned to a Stroke. This shows that our model is not far off in its predictions.

Limitations

Limitations in the Data Collection Process

Dataset is Too Small

The most glaring limitation of this disclosure is the limited dataset. As there is no available dataset regarding squash refereeing decisions, we had to collect our own. Due to the limited time and resources, only 400 data were collected. The dataset is also severely imbalanced, with 243 Yes Lets but only 59 No Lets and 98 Strokes. If more data was provided, our model will be able to have more knowledge and possibly perform better on its tasks.

Speed and Height of The Ball

In our data collection process, we did not collect data related to the speed and the height of the ball. However, those two data can provide critical information to what a decision should be. With similar positioning and different speed and height of the ball, the decision could change from a Stroke to a No Let.

Figure 41:
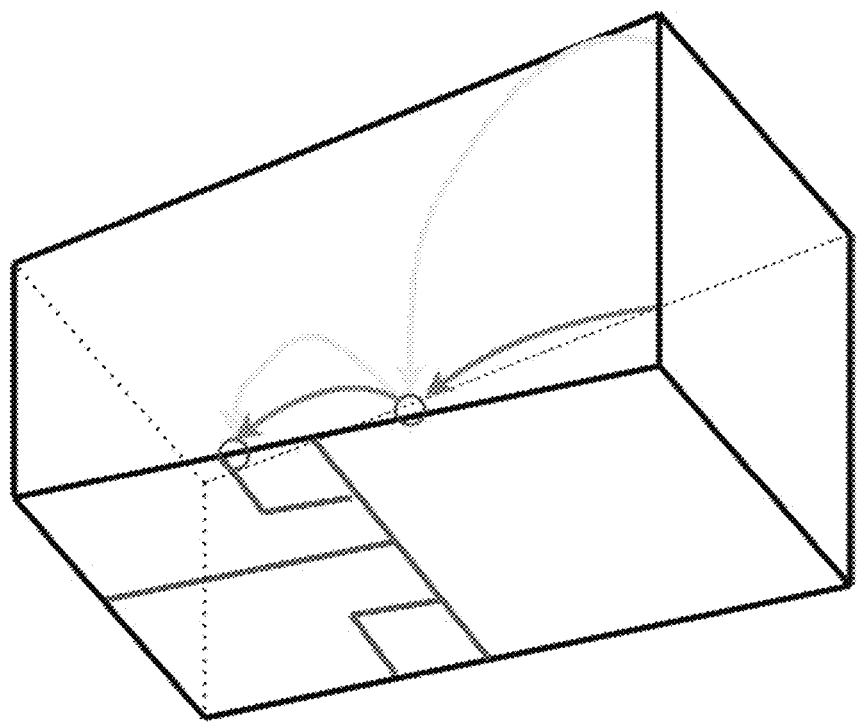
FIG. 41 illustrates how balls with different speed and height can have the same first and second bounce positions.

FIG. 41 illustrates how balls with different speed and height can have the same first and second bounce positions. As shown in the figure, two shots can land in the same position but the implication of the two shots differs drastically. The green path is a slow shot which could be easily retrieved, but the purple path is low and hard to retrieve. Without these two pieces of information, our model cannot learn the difference between the green path and the purple path.

Assumed all Decisions are Correct

During our data collection process, we had assumed all decisions we took in were correct decisions. However, some of them still are controversial (Data #347, see second example of 5.2.1). Our model currently is trained using some controversial data, which may have negatively influenced the model performance. If this issue wants to be resolved, we need more than one squash professionals discussing what each decision should be before putting the data into the dataset.

Took in Different Standard of Refereeing

Different referees have different standards of refereeing. Some referees could be soft, giving more Yes Lets on ambivalent cases. Some referees are harsh and give more Strokes and No Lets. The data collected for this disclosure came from multiple referees, each having an individual system of refereeing. This makes some similar cases in our dataset being classified as different decisions. One way to solve this is also, like 5.3.1.3, to have several squash professionals deciding on one correct decision using one standard of refereeing during the process of data collection.

Different Definition of "Moment"

To collect our data, we defined a "moment," which is the frame when the players first collide or when the ball first enters the attacking player's range of swing. However, it is not always obvious when the moment is. Therefore, throughout the dataset, there are slight inconsistencies in the picking of moments.

When the Ball Bounce Off the Back Wall

When a ball travels deep and bounces off the back wall, it gives the attacking player way more time to retrieve the wall. Most of the time if the ball bounces off the back wall, the situation is not considered No Let. In our dataset we did not put in a measure for when the ball bounced off the back wall. Simply noting down the second bounce of the ball does not tell the model if the ball had reached the back wall and bounced back, giving the AP more time to retrieve the ball.

Time Taken to Clear

A situation could also be decided differently based on how quickly the RP cleared the ball, which means the RP is no longer preventing the AP from striking the ball. In some extreme cases, the RP can take very long or is unable to clear at all.

Figure 42:
FIG. 42 illustrates a video frame corresponding to Data #213 in the dataset of the present disclosure.

FIG. 42 illustrates Data #213, Shabana/Gaultier 2011 World Series Finals 31:11 Stroke (SQUASHTV, 2013). In this case, the AP slipped and has fallen down. Even though the ball was a little bit far away, the referee deemed this situation a Stroke, because the AP has both blocked the path for too long and provided absolutely no path to the ball by falling down. Had the AP stood still, this situation would probably be considered a Yes Let.

Our model currently does not take clearing time into consideration. To improve on this more measures should be taken during the data collection process.

Speed and Arm Length of Different Players

Naturally, different players have different speed and reach. This is also taken into consideration when a referee is making decisions. A player who consistently shows his ability to retrieve hard shots may leave an impression of "fast" to the referee, which potentially makes the referee less inclined to give a No Let to the player.

The speed could be calculated by analyzing video frames or putting motion sensors into the courts. Previous studies had collected data such as max speed and average speed during squash rallies successfully (Murray, James, Perš, Mandeljc & Vučković).

Situations of No Appeal

Sometimes, when a player thinks he is going to get a No Let decision, the player doesn't appeal at all. From a strategic perspective, appealing and being rejected disrupts the mentality and flow of one's game. In our data collection process, we couldn't take in all of those cases, because although there was interference, there was not any appeal at all.

These situations are hard to classify, as these could also be a mistake from the player: the situation may be given as a Let. In some embodiments, these situations can either be put into the category of No Let, or create the fourth category of No Appeal and categorize them as No Appeal.

Ability to Take Further Movement

The referees judge if a player can reach the ball also on the player's ability to take further movement after the interference happened.

Figure 43:
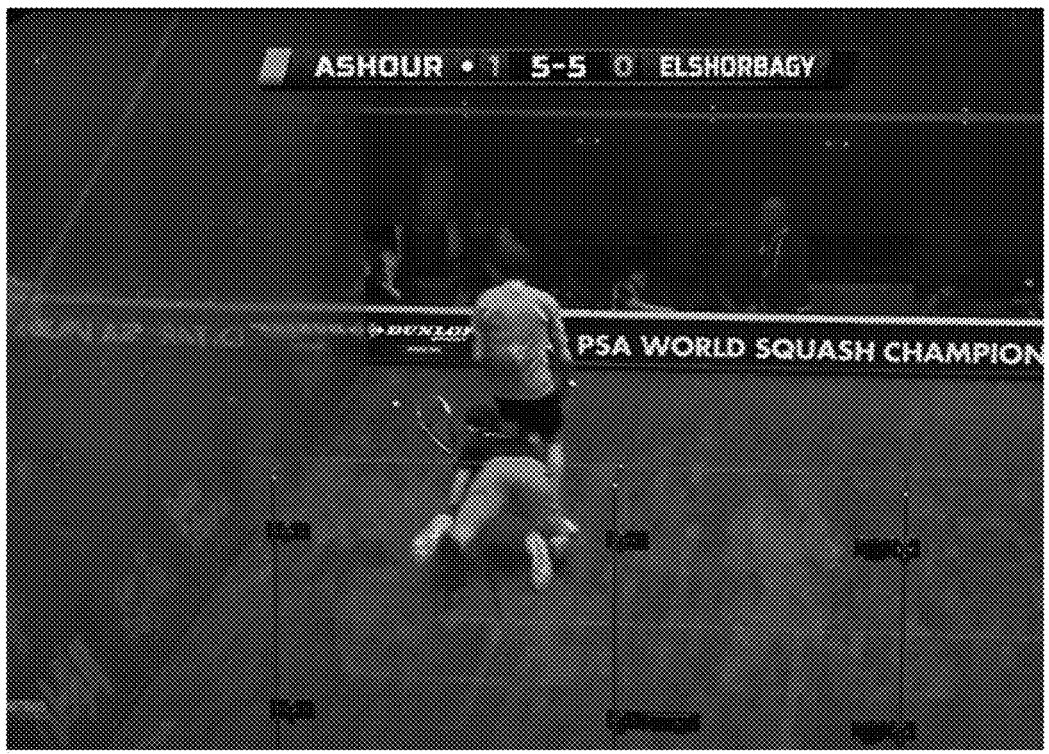
FIG. 43 illustrates a video frame corresponding to Data #249 in the dataset of the present disclosure.

FIG. 43 illustrates Data #249, Ashour/Elshorbagy 2012 World Championship 1:06:12 No Let (SQUASHTV, 2013)

For example, this situation is decided as a No Let. The AP has fallen down before the contact happened, he will not be able to take further movement from this body position. The referee deemed this situation a No Let because the AP could not have reached the ball, although it is only one step away from him. However, our model does not understand that the AP has fallen down and could not take the extra step to the ball. This is another limitation of this disclosure.

Ability to Make Shot

Sometimes, even though the ball is within the reach of the AP, the AP's ability to make shots can be hindered.

Figure 44:
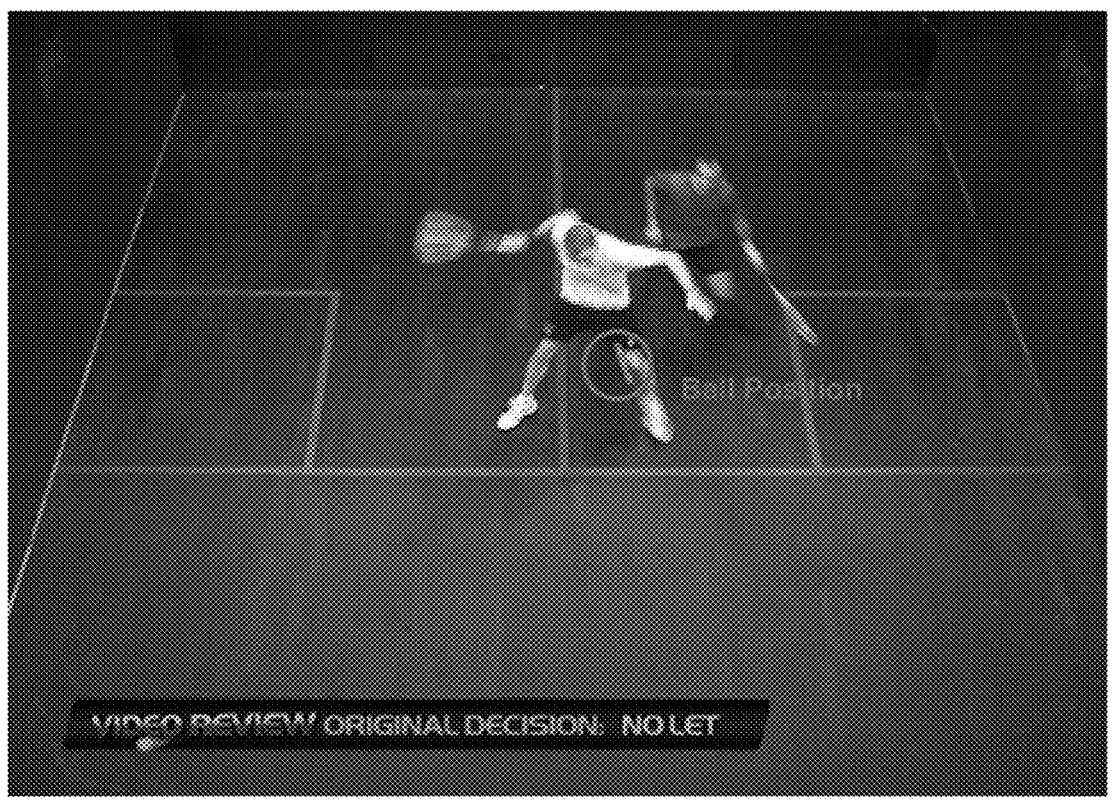
FIG. 44 illustrates another video frame of Squash.

FIG. 44 illustrate a data point Not Included in Dataset, Shabana/Matthew 2013 World Tour Finals 59:30 No Let (SQUASHTV, 2019)

In this case, the ball is right in front of the AP, but the AP could not have hit the ball because the ball went right into him and his racket could not get in position quickly enough. To our model, this is a case where the ball is close to the AP and the AP is close to the RP, which means it could be a Stroke and is at least a Yes Let. However, in the real-life scenario, the AP is unable to hit the ball, therefore it is decided as a No Let.

Degree of Interference

Some interferences can be heavier than others. Usually, the heavier the interference is, the more inclined the referee is to give a Yes Let or a Stroke, because it means that the AP's ability to reach the ball is taken away more.

Figure 45:
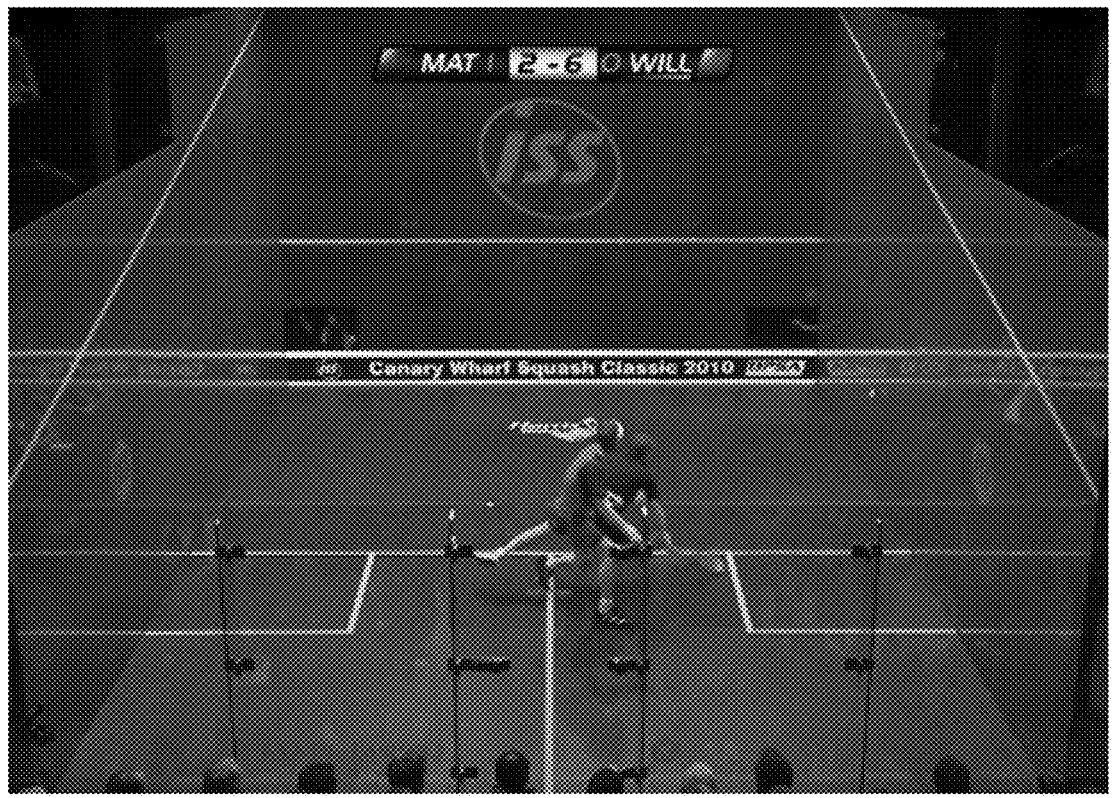
FIG. 45 illustrates a video frame corresponding to Data #157 in the dataset of the present disclosure.

FIG. 45 illustrates Data #157 Matthew/Willstrop 2010 Canary Wharf 39:57 Yes Let (SQUASHTV, 2013)

This is an example of one of the very heavy contacts. The AP fell down after tripping on the RP's foot. Usually, when the AP is taken out completely like this, the referee would not give a No Let no matter how good the ball was.

Our model has no idea of the degree of interference. To account for this, a parameter could be collected by classifying the degree of each interference based on a scale. This is, however, still an objective case and might not be good to be included in the dataset.

Limitations Caused by Abstract Refereeing Concepts

Idea of "Wrong Path"

The concept of "wrong path" is one of the abstract refereeing concepts. To retrieve a shot, the AP should take the closest path to the ball. If the AP has taken the "wrong path" and is then blocked by the RP, the referees may then give a Yes Let or even No Let.

This case often happens when the AP is first deceived by the shot by RP and goes the wrong way. When the AP realizes and goes to the ball from where he is after the initial movement, he is blocked by the RP. The referees sometimes punish the AP by being deceived, in this case, by giving a No Let.

Idea of "Accepting Interference"

The concept of "accepting interference" means that the referee deems the AP went through the interference and can play the ball. Thus, if the AP then stops and appeal, the referee would give a No Let.

Figure 46:
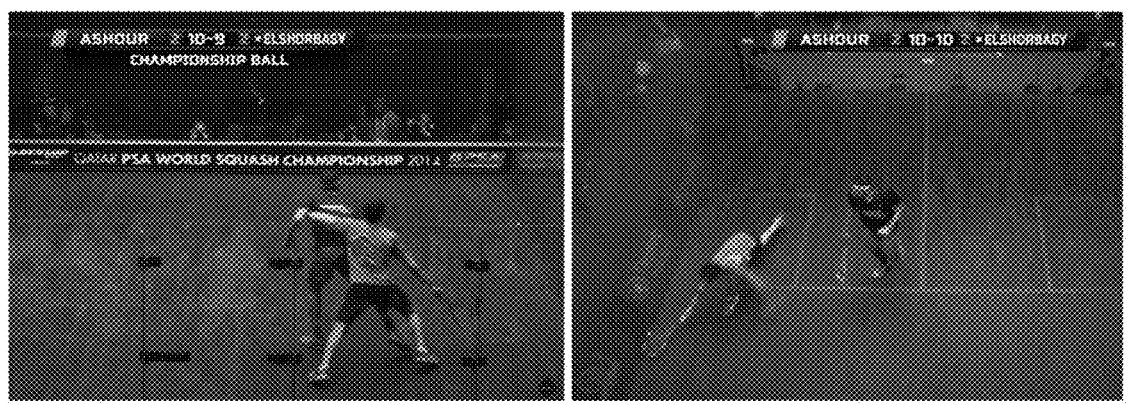
FIG. 46 illustrates video frames corresponding to Data #276 in the dataset of the present disclosure.

FIG. 46 illustrates Data #276, Ashour/Elshorbagy 2014 World Championship 1:21:15 No Let. (SQUASHTV, 2014)

In this case, the AP actually went through the interference and stopped the ball before the second bounce (The AP usually stops the ball to show they can get it, then appeal for a decision). Although the AP showed that he could get it, the referee thinks that when he could play the ball, the RP is already well away from his swing, and he has "accepted the interference" by going through and reaching the ball. The referee therefore gave a No Let.

This idea of accepting interference varies drastically over different referees. Only referees with harsh standards would impose this concept and give No Lets in this case. Other referees understand that the AP has been impacted on the way to the ball and would give a Yes Let. This remains a controversial idea among referees and audiences.

Our Model has no idea what "accepting interference" is. There is no way to learn that "although the AP could have reached the ball, he should have played it."

Idea of "Minimal Interference" and "Lack of Effort"

When the interference is slight and the AP chooses to not play the ball, some referees would give a No Let based on the idea of "minimal interference" and "lack of effort." The referee wants to promote continuous play, which means that the players need to go through interference that is minimal and show effort that they want to play the ball.

Figure 47:
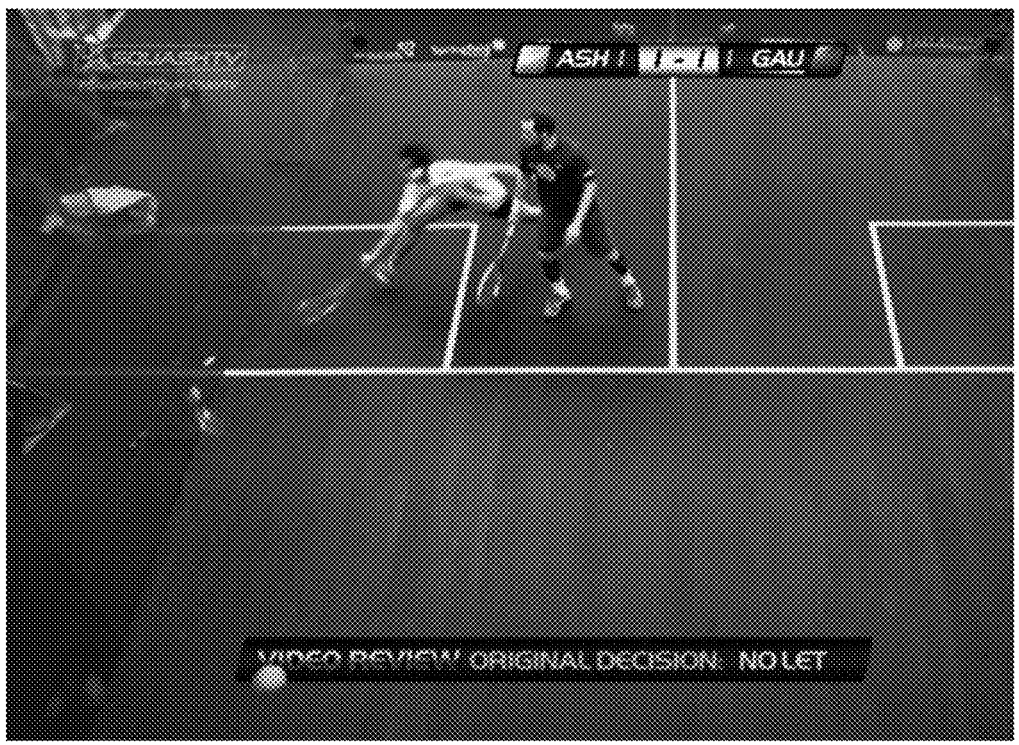
FIG. 47 illustrates another video frame of Squash.

FIG. 47 illustrates a data point Not Included in Dataset, Ashour/Gaultier 2013 British Open 41:08 No Let (SQUASHTV, 2016)

In this case, the AP skimmed through the RP, barely touching him, and decided to stop the ball and appeal. The referee thought that the AP had shown no effort to play the ball, therefore gave a No Let.

The commentators described the situation as this: "We've seen Ramy Ashour (the AP) do this, he does actually get to the ball, but there is interference on his way through . . . Oh, there's not much interference, minimal there, it's minimal. So the question for the referee is why doesn't he go through and play that. There's not a huge amount of interference. This could stay as a No Let, you know, purely because of lack of effort . . . He could have clearly played the ball, he elected not to, and he's paid the price. I think that's a good decision (No Let)."

Our model would only know that the AP is close to the ball and could have got it. It doesn't understand that the referee wants to promote continuous play and those situations should be a No Let.

Idea of "Punishment for Bad Shot," "Going Around Opponent," and "Shut Out"

Figure 48:
FIG. 48 illustrates a video frame corresponding to Data #43 in the dataset of the present disclosure.

FIG. 48 illustrates Data #43, Matthew/Elshorbagy 2014 British Open 55:56 no Let (SQUASHTV, 2014)

In this case, the AP's previous shot was loose and the RP hit a ball straight down the left side wall. The AP tries to get it but his path was blocked by the RP. The RP has "shut out" the AP. The referee gave No Let and explained "the ball was too good."

Here is what the commentators said: "He's taken his space there, Elshorbagy (the RP). Loose shot from Nick Matthew (the AP). Nick Matthew has to go around the back of Elshorbagy if he wants to go and get that ball. (the other commentator) Well, it's his shot to play, Elshorbagy. definitely his shot to play. But you also, I mean, this is where you get the middle ground. Because it's his (the RP's) shot to play, therefore Matthew needs to go around and play the ball, but then he also needs to give access."

To the commentators, this could be decided either way: either a No Let, because the AP played a loose ball therefore should be punished and go the long way through; or a Yes Let, because the RP was not providing the shortest path to the ball.

This is in fact a controversial decision as the referee ideas collide. The RP is not providing a path (shutting the AP out), but the AP has hit a loose shot and has compromised his position at the court to compensate for the bad shot. Some referees think that in this case, it is justified to punish the AP and give a No Let. Some referees believe that because a path was not provided, it should be given as a Yes Let.

Idea of "not Allowing to Clear"

The idea of "not allowing to clear" describes the situation where the AP holds the RP in position to make the situation look more like a Stroke.

Figure 49:
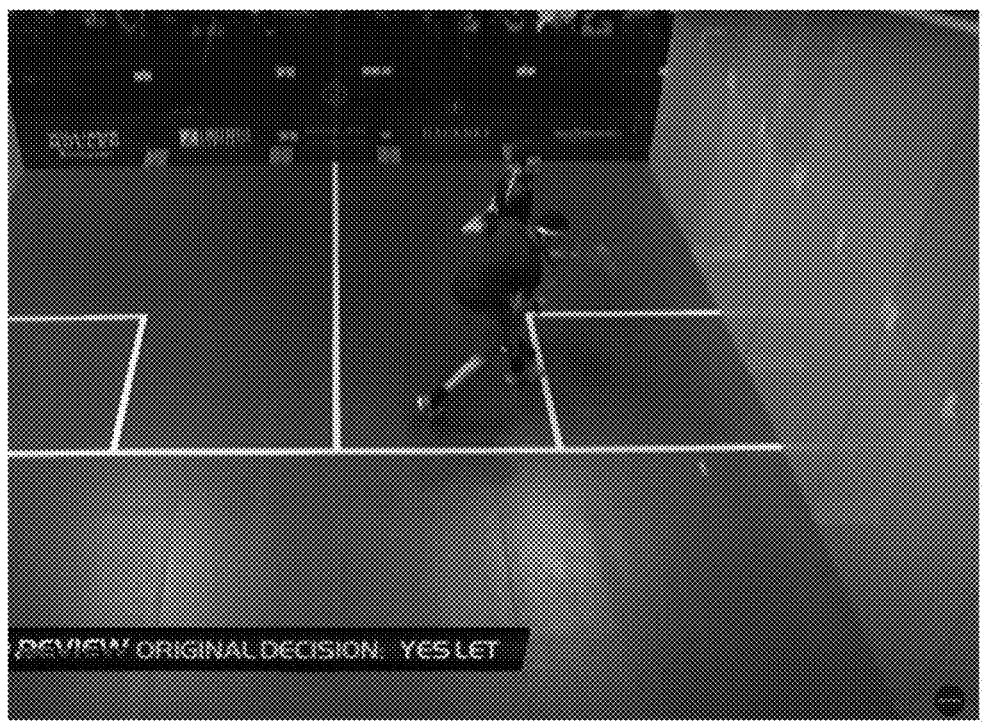
FIG. 49 illustrates a video frame corresponding to Data #316 in the dataset of the present disclosure.

FIG. 49 illustrates Data #316, Elshorbagy/Ashour 2014 World Series Finals 37:47 Yes Let (SQUASHTV, 2016)

In this case, the AP's left hand is holding the RP, preventing the RP from exiting the AP's swing. The referee saw this action and gave a Yes Let instead of a Stroke. If the AP's left hand was not there but the RP was in the same position, the referee may give a Stroke.

CONCLUSION

In this disclosure, we trained neural networks to predict squash referee decisions. The data was collected through extensive video footage reviewing and labeling. 400 interferences were collected as data for this disclosure and six positional values are extracted from those data: the Attacking Player's Position, the Retreating Player's Position, the Ball's Position in the frame, the Ball's Projected First Bounce, the Ball's Projected Second Bounce, and the Attacking Player's Racket Head Position. Using the six positional values, nine more distance values are calculated, such as the distance of the attacking player to the retreating player and the shortest distance from the attacking player's racquet dead to the path of the ball.

Using combinations of the six positional values and the nine distance values, models were trained on two platforms: Wolfram Mathematica and Python with Tensorflow. The best performing model by Wolfram Mathematica achieved an average accuracy of 86%±3.03%; the best performing model by Python performed an average accuracy of 0.852±0.051 (85.2%±5.1%). The accuracies of over 85% indicate near-human performances, as in most squash matches with twenty to thirty decisions the referees already make almost three controversial decisions each match. Our model has a very high potential for improvement, as it is currently being trained with a limited amount of data and lack of essential information such as the time and the speed. Compared to human referees, the models trained through machine learning follow a singular refereeing standard, do not have limited attention span, and make decisions almost instantly. If the accuracy can be further improved, the model can potentially serve as the extra refereeing official for professional squash matches.

Additionally or alternatively, several measures may be taken to improve the model performance.

First of all, simply acquiring more data. This disclosure was trained with only 400 labeled data, which is both limited and unbalanced. If more data was available, the model performance will possibly increase significantly.

Several more methods could be experimented, such as data augmentation, weighting the data during the training process, and thresholding the output values. The dataset could also be split into two separate sections, one includes shots where the second bounce is before the service line, and the other one with shots which second bounces after the service line. This may allow the model to learn more details about how the interferences should be decided.

Some of the new data points could be collected with better tools: speed of the ball, height of the ball, average and max speed of the players, time taken for the ball to die, time taken for the RP to clear, arm length of the player, and the degree of interference. Those values, if considered, could possibly enhance the model performance even more.

Figure 50:
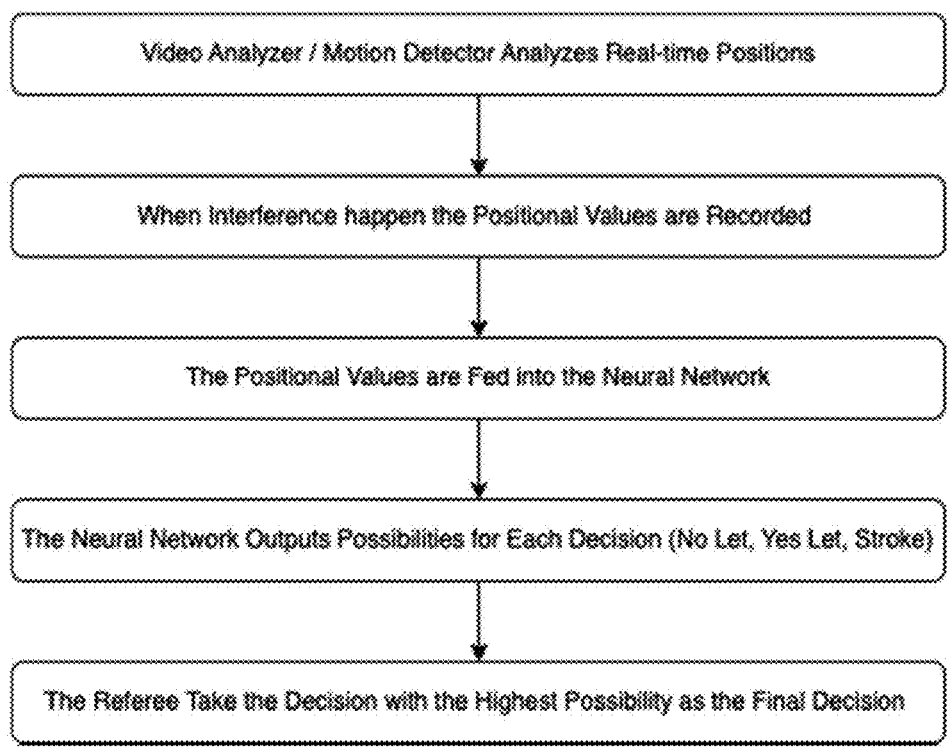
FIG. 50 is a flow chart illustrating a procedure related to the present disclosure.

FIG. 50 is a flow chart illustrating a procedure related to the present disclosure.

FIG. 51 is a block diagram illustrating a procedure related to the present disclosure.

FIG. 52A-52J respectively illustrate some trials of models trained on different configurations of data points. FIG. 52A illustrates two further trials of models trained on all six data points. FIG. 52B illustrates two further trials of models trained for "Dropping out Racket Head Position"; FIG. 52C illustrates four further trials of models trained for "Dropping out Racket Head Position and the First Bounce Position"; FIG. 52D illustrates four further trials of models trained for "Dropping out Racket Head Position and the Second Bounce Position"; FIG. 52E illustrates two further trials of models trained for "all nine modified data (MD) points"; FIG. 52F illustrates two further trials of models trained for "including MD #1-4, #6, and #8-9"; FIG. 52G illustrates two further trials of models trained for "including MD #1-4 and #6"; FIG. 52H illustrates two further trials of models trained for "training with all 21 data points"; FIG. 52I illustrates two further trials of models trained for "training with PD 1-10 and all MD"; FIG. 52J illustrates two further trials of models trained for "training with PD 1-10 and MD #3, #5-6, and #8-9."

Figure 53:
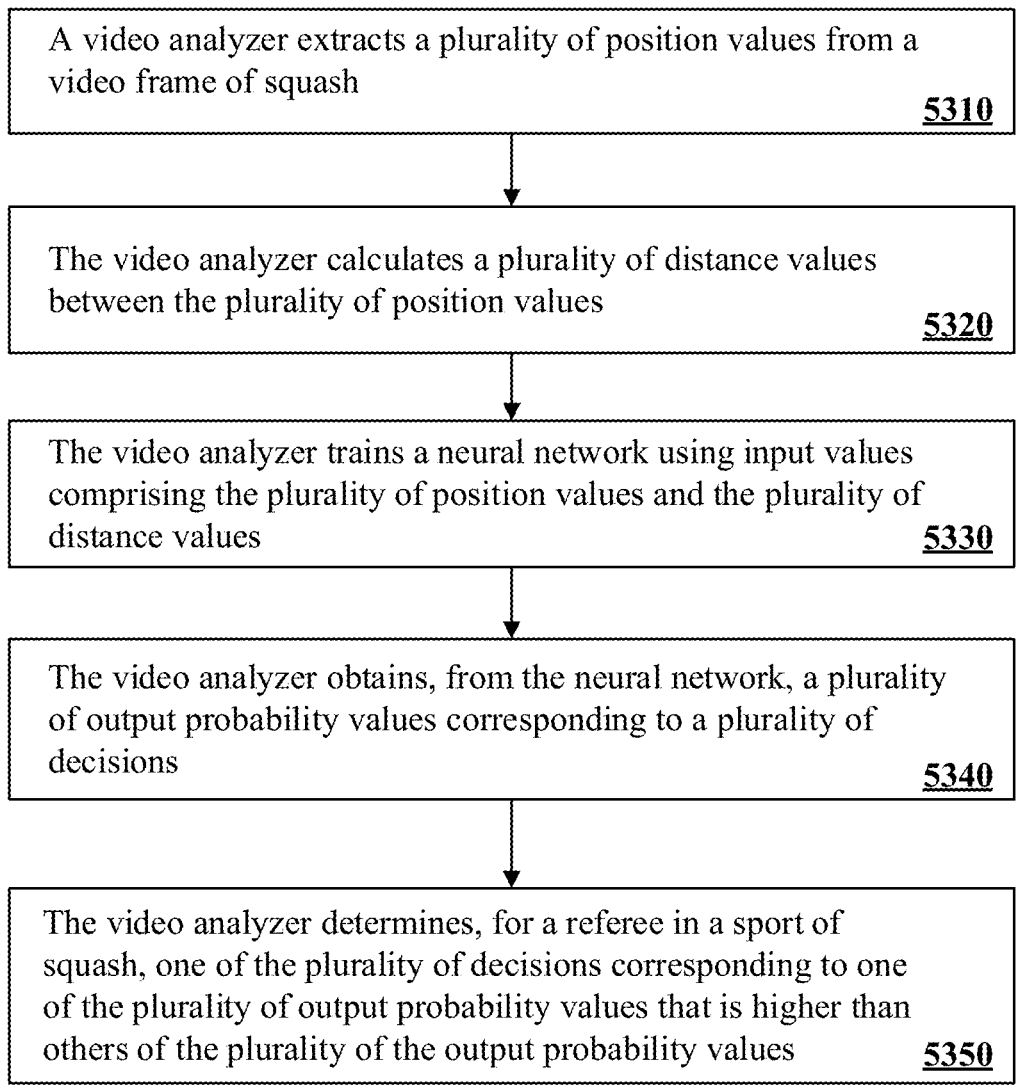
FIG. 53 is a flow chart illustrating a method for making referee decisions in accordance with some examples of the present disclosure.

FIG. 53 is a flow chart illustrating a method for making referee decisions in accordance with some examples of the present disclosure.

In Step S310, a video analyzer extracts a plurality of position values from a video frame of squash. In some examples, the video analyzer may be a motion detector or a motion sensor.

In Step S320, the video analyzer calculates a plurality of distance values between the plurality of position values.

In Step S330, the video analyzer trains a neural network using input values comprising the plurality of position values and the plurality of distance values.

In Step S340, the video analyzer obtains, from the neural network, a plurality of output probability values corresponding to a plurality of decisions.

In Step S350, the video analyzer determines, for a referee in a sport of squash, one of the plurality of decisions corresponding to one of the plurality of output probability values that is higher than others of the plurality of the output probability values.

In some examples, the plurality of positions comprises at least one of following positions: one or more player's position; one or more ball's position; or one or more equipment position.

In one or more examples, the one or more player's position comprises at least one of following positions: an Attacking Player's Position, or a Retreating Player's Position; where the one or more ball's position comprises at least one of following positions: a Ball's Position in the video frame, or the Ball's Projected First Bounce Position, or the Ball's Projected Second Bounce Position; and wherein the one or more equipment position comprises: the Attacking Player's Racket Head Position.

In some examples, the plurality of distances comprises at least one of following distances: one or more player-player distance; one or more equipment-ball distance; one or more player-ball distance; one or more equipment-player distance; one or more ball-ball distance; or one or more blockage distance.

In one or more examples, the one or more player-player distance comprises: a distance between an Attacking Player's Position and a Retreating Player's Position; wherein the one or more equipment-ball distance comprises at least one of following distances: a distance between an Attacking Player's Racket Head Position to a Ball's path; or a distance between the Attacking Player's Racket Head Position and the Ball's Position in the video frame; wherein the one or more player-ball distance comprises at least one of following distances: a distance between the Attacking Player's Position and the Ball's Position in the video frame; a distance between the Retreating Player's Position and the Ball's Position in the video frame; or a distance between the Attacking Player's Position and the Ball's Projected Second Bounce Position; wherein the one or more equipment-player distance comprises: a distance between the Attacking Player's Racket Head Position and the Retreating Player's Position; wherein the one or more ball-ball distance comprises: a distance between the Ball's Position in the video frame and the Ball's Projected Second Bounce Position; and wherein the one or more blockage distance comprises: a distance between a first point and a second point of a front wall, the distance representing a length of a blocked portion of the front wall.

In some examples, the method further comprises: drawing a first line from the Ball's Position in the video frame to a first side of the Retreating Player's Position; drawing a second line from the Ball's Position in the video frame to a second side of the Retreating Player's Position; extending the first line to meet the front wall at the first point; and extending the second line to meet the front wall at the second point.

In some examples, the method further comprises at least one of following steps: performing, by the video analyzer, data augmentation for data used by the neural network; weighing, by the video analyzer and during a training process, the data used by the neural network; or thresholding, by the video analyzer, the plurality of the output probability values.

In some examples, data used by the neural network correspond to shots in the sport of squash, each shot comprises a second bounce, video frames in the sport of squash comprise a service line, and the method further comprises: splitting the data used by the neural network into a first section and a second section, wherein the first section comprises shots in the sport of squash with second bounces before the service line, and the second section comprises shots in the sport of squash with second bounces after the service line.

In some examples, data used by the neural network comprises: a speed of a ball, a height of the ball, an average speed of players, a speed of the players faster than other speeds of the players, time taken for the ball to die, time taken for a Retreating Player to clear, arm lengths of the players, or a degree of interference.

In some examples, there is provided a system for making referee decisions, including: one or more processors; and one or more memories having stored thereon one or more instructions, where the one or more instructions, when executed, causes the one or more processors to perform acts as illustrated in FIG. 53.

In some examples, there is provided a non-transitory computer-readable storage medium for storing computer-executable instructions that, when executed by one or more computer processors, cause the one or more computer processors to perform acts as illustrated in FIG. 53.

The description of the present disclosure has been presented for purposes of illustration and is not intended to be exhaustive or limited to the present disclosure. Many modifications, variations, and alternative implementations will be apparent to those of ordinary skill in the art having the benefit of the teachings presented in the foregoing descriptions and the associated drawings.

Unless specifically stated otherwise, an order of steps of the method according to the present disclosure is only intended to be illustrative, and the steps of the method according to the present disclosure are not limited to the order specifically described above, but may be changed according to practical conditions. In addition, at least one of the steps of the method according to the present disclosure may be adjusted, combined or deleted according to practical requirements.

The examples were chosen and described in order to explain the principles of the disclosure and to enable others skilled in the art to understand the disclosure for various implementations and to best utilize the underlying principles and various implementations with various modifications as are suited to the particular use contemplated. Therefore, it is to be understood that the scope of the disclosure is not to be limited to the specific examples of the implementations disclosed and that modifications and other implementations are intended to be included within the scope of the present disclosure.

What is claimed is:

1. A method for making referee decisions, comprising:
   extracting, by a video analyzer, a plurality of position values from a video frame of squash;
   calculating, by the video analyzer, a plurality of distance values between the plurality of position values;
   training, by the video analyzer, a neural network using input values comprising the plurality of position values and the plurality of distance values;
   obtaining, by the video analyzer and from the neural network, a plurality of output probability values corresponding to a plurality of decisions; and
   determining, by the video analyzer for a referee in a sport of squash, one of the plurality of decisions corresponding to one of the plurality of output probability values that is higher than others of the plurality of the output probability values.

2. The method of claim 1, wherein the plurality of positions comprises at least one of following positions:
   one or more player's position;
   one or more ball's position; or
   one or more equipment position.

3. The method of claim 2, wherein the one or more player's position comprises at least one of following positions:
   an Attacking Player's Position, or a Retreating Player's Position;
   wherein the one or more ball's position comprises at least one of following positions:
   a Ball's Position in the video frame, or the Ball's Projected First Bounce Position, or the Ball's Projected Second Bounce Position; and
   wherein the one or more equipment position comprises:
   the Attacking Player's Racket Head Position.

4. The method of claim 1, wherein the plurality of distances comprises at least one of following distances:
   one or more player-player distance;
   one or more equipment-ball distance;
   one or more player-ball distance;
   one or more equipment-player distance;
   one or more ball-ball distance; or
   one or more blockage distance.

5. The method of claim 4, wherein the one or more player-player distance comprises:
   a distance between an Attacking Player's Position and a Retreating Player's Position;
   wherein the one or more equipment-ball distance comprises at least one of following distances:
   a distance between an Attacking Player's Racket Head Position to a Ball's path; or
   a distance between the Attacking Player's Racket Head Position and the Ball's Position in the video frame;
   wherein the one or more player-ball distance comprises at least one of following distances:
   a distance between the Attacking Player's Position and the Ball's Position in the video frame;
   a distance between the Retreating Player's Position and the Ball's Position in the video frame; or
   a distance between the Attacking Player's Position and the Ball's Projected Second Bounce Position;
   wherein the one or more equipment-player distance comprises:
   a distance between the Attacking Player's Racket Head Position and the Retreating Player's Position;
   wherein the one or more ball-ball distance comprises:
   a distance between the Ball's Position in the video frame and the Ball's Projected Second Bounce Position; and
   wherein the one or more blockage distance comprises:
   a distance between a first point and a second point of a front wall, the distance representing a length of a blocked portion of the front wall.

6. The method of claim 5, wherein the method further comprises:
   drawing a first line from the Ball's Position in the video frame to a first side of the Retreating Player's Position;
   drawing a second line from the Ball's Position in the video frame to a second side of the Retreating Player's Position;
   extending the first line to meet the front wall at the first point; and
   extending the second line to meet the front wall at the second point.

7. The method of claim 1, further comprising at least one of following steps:
   performing, by the video analyzer, data augmentation for data used by the neural network;
   weighing, by the video analyzer and during a training process, the data used by the neural network; or
   thresholding, by the video analyzer, the plurality of the output probability values.

8. The method of claim 1, wherein data used by the neural network correspond to shots in the sport of squash, each shot comprises a second bounce, video frames in the sport of squash comprise a service line, and the method further comprises:
   splitting the data used by the neural network into a first section and a second section, wherein the first section comprises shots in the sport of squash with second bounces before the service line, and the second section comprises shots in the sport of squash with second bounces after the service line.

9. The method of claim 1, wherein data used by the neural network comprises: a speed of a ball, a height of the ball, an average speed of players, a speed of the players faster than other speeds of the players, time taken for the ball to die, time taken for a Retreating Player to clear, arm lengths of the players, or a degree of interference.

10. A system for making referee decisions, comprising:
one or more processors; and
one or more memories having stored thereon one or more instructions, wherein the one or more instructions, when executed, causes the one or more processors to perform acts comprising:
extracting, by a video analyzer, a plurality of position values from a video frame of squash;
calculating, by the video analyzer, a plurality of distance values between the plurality of position values;
training, by the video analyzer, a neural network using input values comprising the plurality of position values and the plurality of distance values;
obtaining, by the video analyzer and from the neural network, a plurality of output probability values corresponding to a plurality of decisions; and
deciding, by the video analyzer for a referee in a sport of squash, one of the plurality of decisions corresponding to one of the plurality of output probability values that is higher than others of the plurality of the output probability values.

11. The system of claim 10, wherein the plurality of positions comprises at least one of following positions:
one or more player's position;
one or more ball's position; or
one or more equipment position.

12. The system of claim 11, wherein the one or more player's position comprises at least one of following positions:
an Attacking Player's Position, or a Retreating Player's Position;
wherein the one or more ball's position comprises at least one of following positions:
a Ball's Position in the video frame, or the Ball's Projected First Bounce Position, or the Ball's Projected Second Bounce Position; and
wherein the one or more equipment position comprises:
the Attacking Player's Racket Head Position.

13. The system of claim 10, wherein the plurality of distances comprises at least one of following distances:
one or more player-player distance;
one or more equipment-ball distance;
one or more player-ball distance;
one or more equipment-player distance;
one or more ball-ball distance; or
one or more blockage distance.

14. The system of claim 13, wherein the one or more player-player distance comprises:
a distance between an Attacking Player's Position and a Retreating Player's Position;
wherein the one or more equipment-ball distance comprises at least one of following distances:
a distance between an Attacking Player's Racket Head Position to a Ball's path; or
a distance between the Attacking Player's Racket Head Position and the Ball's Position in the video frame;
wherein the one or more player-ball distance comprises at least one of following distances:
a distance between the Attacking Player's Position and the Ball's Position in the video frame;
a distance between the Retreating Player's Position and the Ball's Position in the video frame; or
a distance between the Attacking Player's Position and the Ball's Projected Second Bounce Position;
wherein the one or more equipment-player distance comprises:
a distance between the Attacking Player's Racket Head Position and the Retreating Player's Position;
wherein the one or more ball-ball distance comprises:
a distance between the Ball's Position in the video frame and the Ball's Projected Second Bounce Position; and
wherein the one or more blockage distance comprises:
a distance between a first point and a second point of a front wall, the distance representing a length of a blocked portion of the front wall.

15. The method of claim 14, wherein the acts further comprise:
drawing a first line from the Ball's Position in the video frame to a first side of the Retreating Player's Position;
drawing a second line from the Ball's Position in the video frame to a second side of the Retreating Player's Position;
extending the first line to meet the front wall at the first point; and
extending the second line to meet the front wall at the second point.

16. The system of claim 10, wherein the acts further comprise at least one of following steps:
performing, by the video analyzer, data augmentation for data used by the neural network;
weighing, by the video analyzer and during a training process, the data used by the neural network; or
thresholding, by the video analyzer, the plurality of the output probability values.

17. The system of claim 10, wherein data used by the neural network correspond to shots in the sport of squash, each shot comprises a second bounce, video frames in the sport of squash comprise a service line, and the acts further comprise:
splitting the data used by the neural network into a first section and a second section, wherein the first section comprises shots in the sport of squash with second bounces before the service line, and the second section comprises shots in the sport of squash with second bounces after the service line.

18. The system of claim 10, wherein data used by the neural network comprises: a speed of a ball, a height of the ball, an average speed of players, a speed of the players faster than other speeds of the players, time taken for the ball to die, time taken for a Retreating Player to clear, arm lengths of the players, or a degree of interference.

19. A non-transitory computer-readable storage medium for storing computer-executable instructions that, when executed by one or more computer processors, cause the one or more computer processors to perform acts comprising:
extracting, by a video analyzer, a plurality of position values from a video frame of squash;
calculating, by the video analyzer, a plurality of distance values between the plurality of position values;
training, by the video analyzer, a neural network using input values comprising the plurality of position values and the plurality of distance values;
obtaining, by the video analyzer and from the neural network, a plurality of output probability values corresponding to a plurality of decisions; and
determining, by the video analyzer for a referee in a sport of squash, one of the plurality of decisions corresponding to one of the plurality of output probability values that is higher than others of the plurality of the output probability values.

20. The non-transitory computer-readable storage medium of claim 15, wherein the plurality of positions comprises at least one of following positions:
one or more player's position;
one or more ball's position; or
one or more equipment position; and
wherein the plurality of distances comprises at least one of following distances:
one or more player-player distance;
one or more equipment-ball distance;
one or more player-ball distance;
one or more equipment-player distance;
one or more ball-ball distance; or
one or more blockage distance.

* * * * *